(12) United States Patent
Johnson et al.

(10) Patent No.: US 7,219,859 B2
(45) Date of Patent: May 22, 2007

(54) MULTIPURPOSE MODULAR SPACECRAFT

(75) Inventors: Michael D. Johnson, Friendswood, TX (US); James D. Baker, Pearland, TX (US); Frank T. Eichstadt, Kemah, TX (US); Michael E. Bain, Houston, TX (US)

(73) Assignee: Spacehab, Incorporated, Webster, TX (US)

( * ) Notice: Subject to any disclaimer, the term of this patent is extended or adjusted under 35 U.S.C. 154(b) by 89 days.

(21) Appl. No.: 11/097,923

(22) Filed: Apr. 1, 2005

(65) Prior Publication Data
US 2006/0219846 A1   Oct. 5, 2006

(51) Int. Cl.
*B64G 1/00* (2006.01)
(52) U.S. Cl. .............. 244/159.1; 244/158.9; 244/171.7; 244/173.1
(58) Field of Classification Search ........... 244/158.9, 244/159.1–159.3, 123.11, 134 A, 173.1, 173.3
See application file for complete search history.

(56) References Cited

U.S. PATENT DOCUMENTS

| | | | |
|---|---|---|---|
| 2,941,764 A | 6/1960 | Lee et al. | |
| 2,981,499 A * | 4/1961 | Janney, II | 244/2 |
| 2,992,794 A * | 7/1961 | Boyd | 244/3.15 |
| 3,001,739 A | 9/1961 | Faget et al. | |
| 3,002,719 A * | 10/1961 | Weiland et al. | 244/118.1 |
| 3,047,259 A | 7/1962 | Tatnall et al. | |
| 3,079,113 A | 2/1963 | Meyer, Jr. | |
| 3,093,346 A | 6/1963 | Faget et al. | |
| 3,105,658 A | 10/1963 | Marshall et al. | |
| 3,118,636 A | 1/1964 | Kantrowitz et al. | |
| 3,119,576 A | 1/1964 | Neilsen | |
| 3,123,323 A | 3/1964 | Wise | |
| 3,156,433 A | 11/1964 | White, Jr. | |
| 3,158,336 A | 11/1964 | Warren et al. | |
| 3,168,266 A * | 2/1965 | Yost | 244/138 R |
| 3,176,933 A * | 4/1965 | Clemmons, Jr. | 244/158.3 |
| 3,212,730 A | 10/1965 | Tschudy et al. | |
| 3,215,372 A * | 11/1965 | Price | 244/74 |
| 3,229,936 A | 1/1966 | Quillnan | |
| 3,250,499 A | 5/1966 | Carroll | |
| 3,259,065 A | 7/1966 | Ross et al. | |
| 3,262,365 A | 7/1966 | Warren et al. | |
| 3,269,673 A | 8/1966 | Reiniger | |
| 3,270,908 A | 9/1966 | Faget et al. | |
| 3,276,722 A | 10/1966 | Eggers, Jr. et al. | |
| 3,286,951 A | 11/1966 | Kendall | |
| 3,295,790 A | 1/1967 | Webb | |

(Continued)

OTHER PUBLICATIONS

"Space Shuttle Obiter Systems" NASA; Dumoulin, Jim, Aug. 31, 2000 Taken from the NSTS Shuttle Reference Manual (1988) http://science.ksc.nasa.gov/shuttle/technology/sts-newsref/sts_sys.html.*

(Continued)

*Primary Examiner*—Teri Pham Luu
*Assistant Examiner*—Joseph W. Sanderson
(74) *Attorney, Agent, or Firm*—Haynes and Boone, LLP; Dave R. Hofman

(57) ABSTRACT

A reentry vehicle includes a nose section, a modular section comprised of two or more connected modules, a flared section. The nose section is connected to a first end of the modular section, and the flared section is positioned proximate a second end of the modular cylindrical section.

64 Claims, 19 Drawing Sheets

U.S. PATENT DOCUMENTS

| | | | |
|---|---|---|---|
| 3,311,323 A | 3/1967 | Cappel | |
| 3,330,510 A | 7/1967 | Johnson | |
| 3,386,685 A | 6/1968 | Judd | |
| 3,390,853 A | 7/1968 | Wykes | |
| 3,433,435 A | 3/1969 | Alai | |
| 3,508,724 A | 4/1970 | Scher et al. | |
| 3,576,298 A * | 4/1971 | Barnett et al. | 244/159.3 |
| 3,702,688 A * | 11/1972 | Faget | 244/159.3 |
| 3,966,142 A * | 6/1976 | Corbett et al. | 244/12.4 |
| 4,379,533 A * | 4/1983 | Caldwell et al. | 244/118.1 |
| 4,504,031 A | 3/1985 | Andrews | |
| 4,518,137 A | 5/1985 | Andrews | |
| 4,549,464 A * | 10/1985 | Hawkins et al. | 89/1.809 |
| 4,562,979 A * | 1/1986 | Taylor | 244/159.4 |
| 4,650,139 A * | 3/1987 | Taylor et al. | 244/172.4 |
| 4,832,288 A | 5/1989 | Kendall et al. | |
| 4,834,324 A * | 5/1989 | Criswell | 244/158.9 |
| 4,896,847 A | 1/1990 | Gertsch | |
| 5,108,046 A | 4/1992 | Chaumette et al. | |
| 5,108,047 A | 4/1992 | Puech | |
| 5,145,129 A * | 9/1992 | Gebhard | 244/12.5 |
| 5,158,248 A | 10/1992 | Mockovciak, Jr. | |
| 5,305,970 A * | 4/1994 | Porter et al. | 244/172.2 |
| 5,402,965 A * | 4/1995 | Cervisi et al. | 244/2 |
| 5,526,999 A * | 6/1996 | Meston | 244/2 |
| 5,626,310 A * | 5/1997 | Kelly | 244/2 |
| 5,743,492 A * | 4/1998 | Chan et al. | 244/118.2 |
| 6,056,237 A * | 5/2000 | Woodland | 244/3.15 |
| 6,059,234 A * | 5/2000 | Mueller et al. | 244/173.1 |
| 6,076,771 A | 6/2000 | Bailey et al. | |
| 6,158,693 A * | 12/2000 | Mueller et al. | 244/158.9 |
| 6,264,144 B1 | 7/2001 | Thornton | |
| 6,360,994 B2 * | 3/2002 | Hart et al. | 244/171.3 |
| 6,446,905 B1 * | 9/2002 | Campbell et al. | 244/2 |
| 6,467,731 B1 | 10/2002 | Harris et al. | |
| 6,607,166 B1 | 8/2003 | Pichkhadze et al. | |
| 6,723,972 B2 | 4/2004 | Schroeder et al. | |
| 6,827,313 B1 * | 12/2004 | Aldrin | 244/171.1 |

OTHER PUBLICATIONS

"diameter" The American Heritage® Concise Dictionary (1994). Retrieved Aug. 14, 2006, from xreferplus. http://www.xreferplus.com/entry/697575.*

P.V. Vashchenkov, M.S. Ivanov, *Numerical Analysis of High Altitude Aerothermodynamics of EXPERT Reentry Vehicle*, 2002.

E.S. Love, *Factors Influencing Configuration and Performance of Mulitpurpose Manned Entry Vehicles*, J. Spacecraft, vol. 1, No. 1, Jan. 1964, pp. 3-12.

D.R. Chapman, *On the Corridor and Associated Trajectory Accuracy for Entry of Manned Spacecraft into Planetary Atmospheres*, Proc. Xth Intern. Astronautical Congress, Springer-Verlag, Vienna, 1960, pp. 254-267.

C. Gazley, Jr., *Atmospheric Entry, Handbook of Astronautical Engineering*, McGraw-Hill 1961, pp. 10-2 to 10-34.

D.E. Reese, et al., *NASA TM X-110: An Investigation of the Static and Dynamic Aerodynamic Characteristics of a Series of Blunt-Nosed Cylinder Flare Models at Mach Numbers from 0.65 to 2.20*, Jan. 1960.

D.E. Whiting, et al., *NASA TM X-500: Free-Flight Investigation of the Static Stability and Aerodynamic Drag of Three Blunt-Nosed Cylinder Flare Test Bodies at Mach Numbers from 13 to 17*, Mar. 1961.

J.W. Cleary, *NASA TM X-506: Flow Separation on Ellipsoidal-Nosed Cylinder-Flare Models at Transonic Mach Numbers*, May 1961.

A. Seiff and E. Whiting, *The Effect of the Bow Shock Wave on the Stability of Blunt Nosed Slender Bodies*, Ames Research Center.

A. Seiff, *Recent Information on Hypersonic Flow Fields*, Gas Dynamics, pp. 269-282.

R. Blaylock, *WT 21-148: Force Test of a Cold-Wall Blunt-Nose Cylinder-Flare Model in Air-Carbon-Dioxide Mixtures in the JPL 21-Inch Hypersonic Wind Tunnel*, Jet Propulsion Laboratory, Mar. 15, 1964.

H. Fletcher and W. Wolhart, *NASA Memo 5-6-59L: Damping in Pitch and Static Stability of a Group of Blunt-Nose and Cone-Cylinder-Flare Models at a Mach Number of 6.83*, May 1959.

C. W. Winters, *NASA TN D-2383: Heat Transfer Rates and Ablation on a Blunted Cylinder-Flare Configuration in Free Flight Up to a Mach Number of 8.98*, Aug. 1964.

L.H. Jorgensen and L.W. Graham, *NASA TM X-1103: Predicted and Measured Aerodynamic Characteristics for Two Types of Atmosphere-Entry Vehicles*, 1965.

A. Seiff, *NASA TN D-1304: Secondary Flow Fields Embedded in Hypersonic Shock Layers*, May 1962.

P.G. Bakker and W.J. Bannink in *Report LR 765: Flow Visualization Study of High Supersonic Flow Past a Blunt Cylinder-Cone Flare Body*, Delft University of Technology, Jun. 1994.

* cited by examiner

MULTIPURPOSE MODULAR SPACECRAFT

BACKGROUND OF THE INVENTION

This invention relates generally to a multipurpose modular reusable spacecraft. Various spacecraft are known in the prior art.

One example of a prior art spacecraft is the Russian Vostok 3KA. The Vostok 3KA reentry vehicle was a non-lifting sphere, which at the time, was a simple and reliable form. The spherical shape of the Vostok 3KA spacecraft had limited volumetric efficiency and subjected crew members to the maximum possible reentry deceleration forces. The Luna 16, 20, and 24 vehicles also used a spherical reentry vehicle for unmanned lunar missions. At lunar return speeds, however, the deceleration forces imposed on spherical reentry vehicles are lethal to humans. Spherical reentry vehicles cannot be used for manned lunar mission return.

Various space agencies have used a classic conical ballistic capsule shape for the Discoverer, Mercury, Gemini, Apollo, Soyuz, and Merkur spacecraft. These capsules were able to generate lift because the center of gravity was offset from the trim line which reduces the deceleration forces on the vehicle but these vehicles still suffered from poor volumetric efficiency.

Other reentry vehicles include lifting body shapes that further reduce deceleration forces and increase the maneuverability or cross range capability resulting in increased landing accuracy. These vehicles are generally not suited to carrying large payloads. A winged reentry vehicle with a high lift to drag ratio, such as the US Space Shuttle, suffers from sensitivity to the center of gravity position.

SUMMARY OF THE INVENTION

In one aspect, the invention relates to a reentry vehicle that includes a nose section, a modular section comprised of two or more connected modules, and a flared section. The nose section is connected to a first end of the modular section, and the flared section is positioned proximate a second end of the modular cylindrical section. In at least one embodiment, the modular section comprises a cylindrical cross section.

In another aspect, the invention relates to a method of transferring a payload in orbit that includes docking a reentry vehicle with an object in orbit, depressurizing the reentry vehicle, opening an access port in the reentry vehicle, transferring the payload, closing the access port, and pressurizing the reentry vehicle. In at least one embodiment, the transferring the payload includes capturing the payload. In at least one embodiment, the transferring the payload includes deploying the payload.

In another aspect, the invention relates to a method of entering a planetary atmosphere that includes deploying a flared section of a reentry vehicle to a first position, dissipating kinetic energy in a rarefied portion of the atmosphere, and deploying the flared section in a second position. The first position has a larger cross sectional area than the second position, and the reentry vehicle approaches the planetary atmosphere above an overshoot boundary for the vehicle when the flared section is in the second position.

In another aspect, the invention relates to a reentry vehicle that includes a modular section comprised of two or more modules sealingly coupled to each other, a nose section connected to a first of the two or more modules at a first end of the modular cylindrical section, and a flared section proximate a second end of the modular cylindrical section and positioned to protect at least one of the one or more cylindrical modules. An aft one of the one or more modules forms an aft cylindrical module and comprises a crew hatch and a propulsion and maneuvering system.

In another aspect, the invention relates to a reentry vehicle that includes a means for dissipating reentry heat, a means for stabilizing the reentry vehicle during hypersonic flight, and a means for selecting a payload volume of the reentry vehicle.

In another aspect, the invention relates to a modular vehicle that includes at least one module adapted to form a secondary structure for a primary vehicle, and an adapter for connecting the modular vehicle to the primary vehicle.

DETAILED DESCRIPTION

Figure 1:
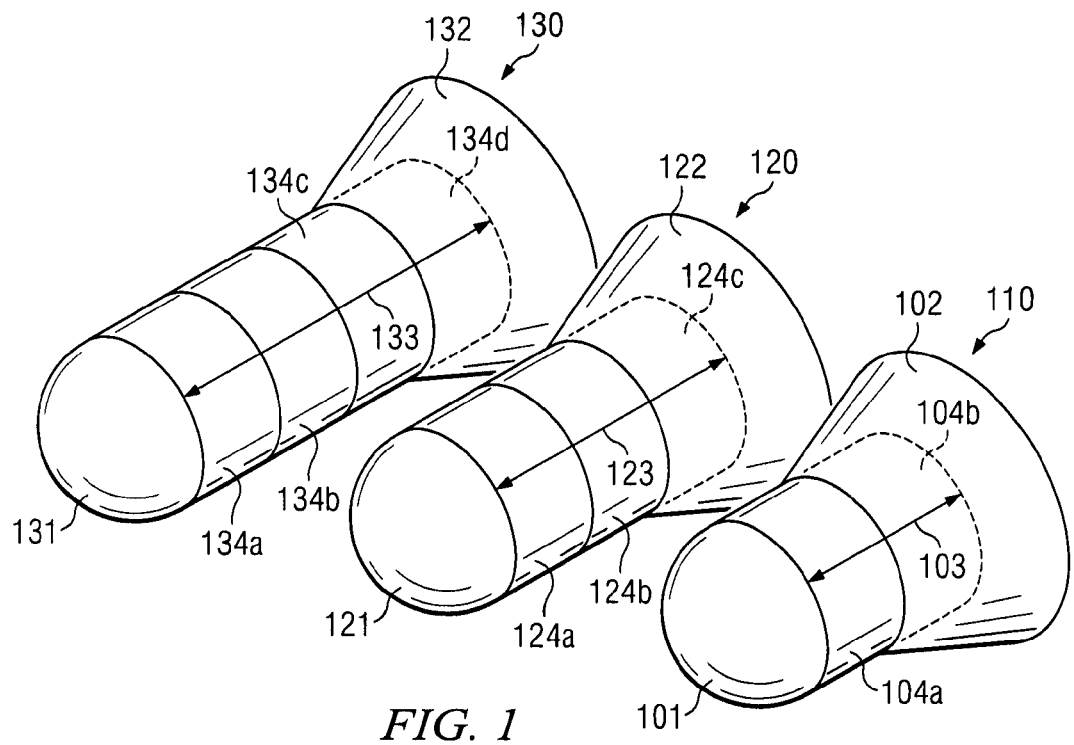
FIG. 1 shows a perspective view of three embodiments of a reentry vehicle.

Referring to FIG. 1, a first embodiment of a reentry vehicle 110 includes a nose 101, a modular section 103, and a flared section 102. The modular section 103 of the first reentry vehicle 110 includes two modules 104a, 104b. Only a single module 104a is visible above the flared section 103; the other module 104b is shown in dashed lines. The nose 101 is connected to the modular section 103 at a first end, and the flared section 102 is positioned proximate the aft end of the modular section 103.

The flared section 102 is located proximate to the aft of the cylindrical section 103, and it may cover or protect a portion of the modular section 103. Thus, the flared section 102 may be used to protect equipment that must be exposed in orbit but protected during reentry. For example, a crew hatch may be positioned under the flared section 102 in module 104b. When the flared section 102 is deployed, it will protect the hatch. In addition, other equipment such as thruster orifices, antennas, radiators, recovery systems, landing bags, flotation systems, and other recovery aids, and various other items, may be located under the flared section 102.

A nose section may include a thermal protection system, such as heat shielding, to protect against the heat of reentry. In some embodiments of a reentry vehicle, the nose section dissipates most of the reentry heat. Depending on the orientation of the reentry vehicle 110, the remainder of the reentry vehicle 110 may experience very little heating compared to the nose 101.

The second embodiment of a reentry vehicle 120 in FIG. 1 includes a nose 121, a modular section 123, and a flared section 122. The nose 121 is connected to the modular section 123 at a first end, and the flared section 122 is positioned proximate the aft end of the modular section 123. The modular section 123 of the second vehicle 120 includes three modules 124a, 124b, 124c, and only the first two 124a, 124b are visible above the flared section 122. The third module 124c is under the flared section 122 and is shown in dashed lines. The third vehicle 130 includes a nose portion 131, a cylindrical modular section 133, and a flared section 132. The cylindrical modular portion 133 of the third vehicle 130 includes four modules 134a, 134b, 134c, 134d. The fourth module 134d is under the flared section 132 and shown in dashed lines.

A modular section generally refers to a section of the vehicle that is formed with modules. FIG. 1 shows the modularity of embodiments of a reentry vehicle. For a particular mission, the payload volume may be selected by varying the number of modules in the reentry vehicle. A mission requiring a large volume may be accommodated by simply adding modules to the modular section until the desired volume is achieved. For a mission requiring a smaller volume, fewer modules may be used. As explained with reference to FIG. 2, the hypersonic stability of a reentry vehicle may be largely insensitive to the length of the vehicle. Thus, the volume of a reentry may be selected based on the payload requirements, without affecting the hypersonic stability of the vehicle.

It is noted that a modular section may include as few as one module, if a mission requires only a small volume capacity. In addition, the number of modules used in a particular vehicle is not limited to four or less. More than four modules may be used for higher volume requirements. In some embodiments, the modules are identical modules. In other embodiments, the size and features of the modules may be specifically selected to suit specific needs.

Each of the reentry vehicles 110, 120, 130 shown in FIG. 1 have a different number of modules 104a–b, 124a–c, 134a–d, and thus, each has a different length. Yet, as will be described with reference to FIG. 2, the hypersonic aerodynamic stability characteristics of the vehicles 110, 120, 130 are substantially the same.

The nose, modular section, and any aft section may be connected to form air-tight seals. In other embodiments, the interior of a reentry may not be air-tight so that the pressure inside the reentry vehicle may fluctuate with the pressure outside the reentry vehicle. In some embodiments, the components may be sealingly coupled to each other to for an air-tight seal, and the reentry vehicle may include valves so that air may selectively flow into or out of the reentry vehicle.

In an exemplary embodiment, a modular section has a cylindrical cross section. However, other shapes may be used. For example, a modular section may have an elliptical cross section or it may be shaped in an oval. The shape of the modular section is not intended to be limiting.

The nose 101, 121, 131 for each of the vehicles 110, 120, 130 is shown as a blunt nose. In one or more preferred embodiments, a blunt nose is used because it generates a large bow shockwave that dissipates the majority of the reentry energy, thereby protecting the rest of the vehicle. Other types of noses may be used. For example, a parabolic or hemispherical nose may be utilized. In some situations, a conical nose may also be used.

The flared section 102, 122, 132 for each of the vehicles 110, 120, 130 acts in effect as a hypersonic weathervane that may provide directional stability to the reentry vehicle 100, 120, 130 during hypersonic flight. In some embodiments, as will be explained, a flared section may be moved between a stowed position and a deployed position. In some embodiments, a flared section may have an adjustable geometry so that it may have multiple deployed positions. Such positions may be selected based on the desired effect of the flared section. In other embodiments, a flared section may have two or more stages, where a stage may be jettisoned once it is no longer needed and another stage is to be used.

In an exemplary embodiment, a flared section, shown at 102 in FIG. 1 for example, is constructed of a refractory fabric and covered with an ablative coating. A pressurized bladder, not shown, may be located inside the flared section 102 to maintain and control the shape of the flared section 102. In one embodiment, the flared section 102 is shaped like a cone segment. That is, it does not form an entire cone; the conical section terminates before it reaches an apex. In this respect, a flared section may have a frustoconical shape. In other embodiments, the flared section may have an asymmetrical shape. An asymmetrical shape may help orient the vehicle so that the reentry vehicle will have a desired orientation during reentry. In other embodiments, the shape and size of the flared section may be modulated to control the orientation and flight of the reentry vehicle.

A flared section 102 need not be constructed of a refractory fabric. Other high-temperature tolerant materials may be used. For example, a high-temperature tolerant ceramic may be used to construct the flared section. In addition, high-temperature tolerant metals, such a INCONEL, may be used. The high-temperature tolerant materials in the flared section may comprise a woven screen. The term high-temperature tolerant denotes a material capable of withstanding the heat generated on the flared section during reentry. Because the reentry heat will vary from mission to mission, the exact nature of a high-temperature tolerant material may vary, depending on the specifics of a particular mission.

Figure 2:
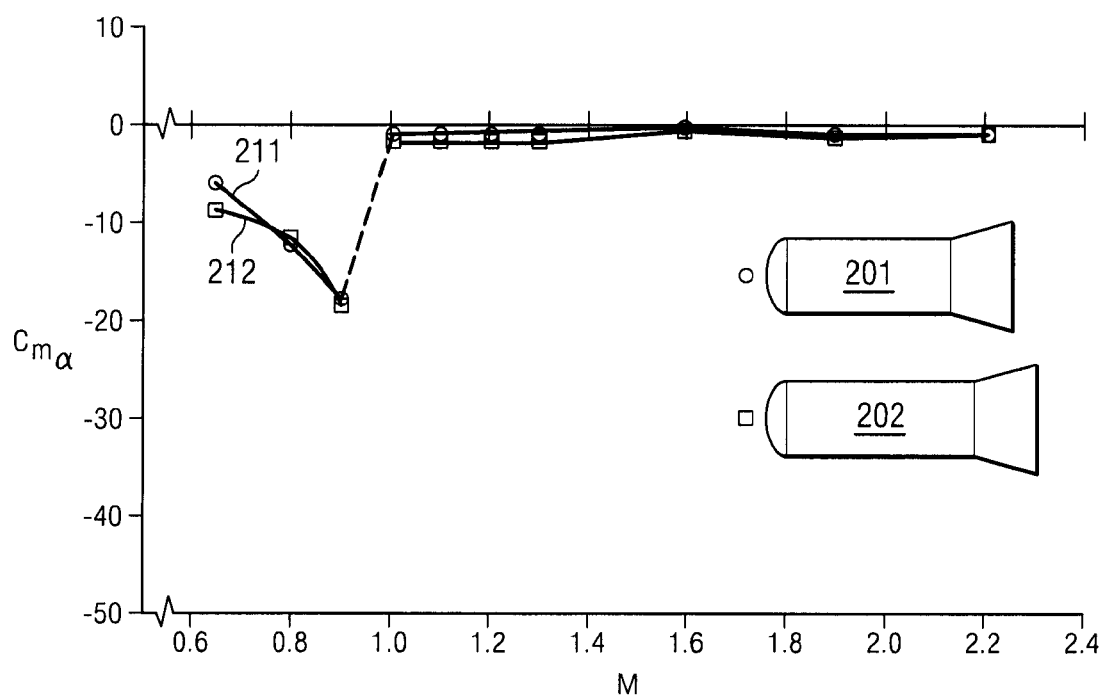
FIG. 2 shows a graph of the pitching moment coefficient on the vertical axis as a function of vehicle length on the horizontal axis for two reentry vehicles of varying length.

FIG. 2 is a graph that shows the pitching moment coefficient as a function of Mach number for two reentry vehicles 201, 202. The only difference between the two reentry vehicles 201, 202 is that the first vehicle 201 has a shorter length that the second vehicle 202. For example, vehicle 201 may be similar to reentry vehicle 120 in FIG. 1, having three modules that form the modular section. Vehicle 202 may be similar to reentry vehicle 130 in FIG. 1, having four modules that form the modular section. Line 211 on the graph shows the pitching moment coefficient of the first vehicle 201 versus Mach number, and line 212 on the graph shows the pitching moment coefficient of the second vehicle 202 versus Mach number.

The graph in FIG. 2 shows that pitching moment coefficient for the vehicles 201, 202 is substantially the same for the different sized vehicles 201, 202 at speeds above Mach 1.0. Thus, for some embodiments of a reentry vehicle, changing the length of the vehicle, or the length to diameter ratio, will largely not affect the stability of the vehicle at hypersonic speeds. The graph includes velocities up to Mach 2.2, but the principle is valid up to about Mach 30.

Because the stability of such a reentry vehicle is relatively insensitive to the vehicle length, the length of the vehicle, and thus, the volume of the vehicle, may be selected based on the requirements of a particular mission. In a preferred embodiment, a reentry vehicle, such as the reentry vehicles 110, 120, 130 in FIG. 1, may have a modular section 103, 123, 133 comprised of a number of modules 104a–b, 124a–c, 134a–d that is selected based on mission payload volume requirements. Even with the different lengths and volumes, each of the three vehicles 110, 120, 130 shown in FIG. 1 have substantially the same hypersonic aerodynamic stability characteristics.

Figure 3A:
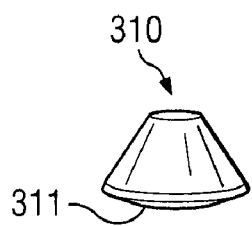
FIG. 3A shows a perspective view of a prior art Apollo-style reentry vehicle.

In general, any reentry vehicle design will be limited by the allowable launch diameter. That is, the inside diameter of the launch vehicle fairing represents the upper limit on the diameter of the reentry vehicle. FIG. 3A, for example, shows the general conical shape of the reentry vehicle 310 used for Apollo missions to the Moon. The largest diameter of the Apollo-style reentry vehicle 310 is at the bottom 311 of the vehicle. To increase the volume on an Apollo-style capsule 310, the area of the bottom 311 must also be significantly increased. Thus, the maximum volume of such a capsule 310 is limited by the bottom diameter that will fit into the launch vehicle fairing.

Figure 3B:
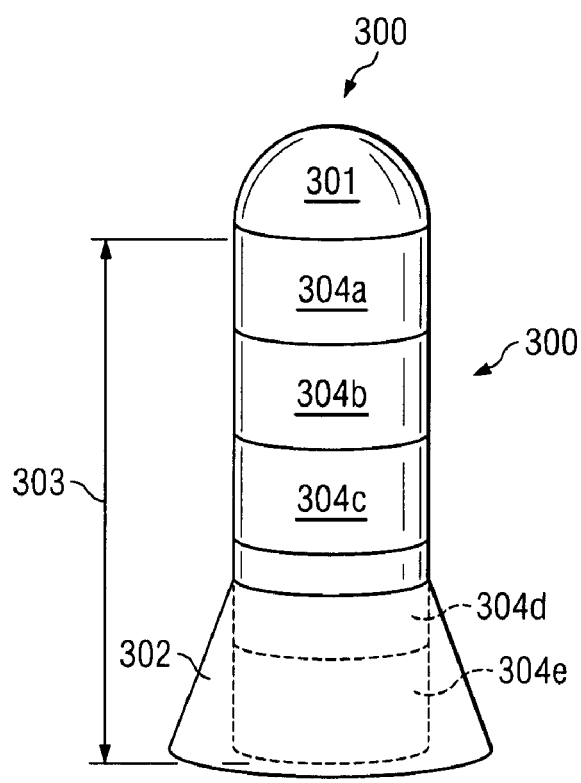
FIG. 3B shows a perspective view of one embodiment of a reentry vehicle.
Figure 3C:
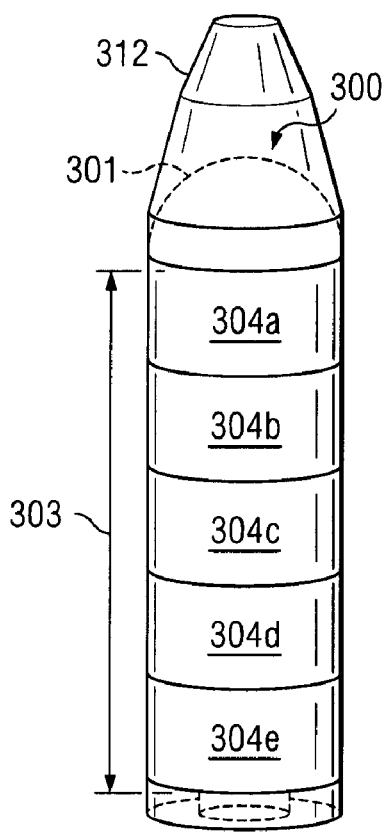
FIG. 3C shows a perspective view of one embodiment of a reentry vehicle located inside a launch vehicle fairing.

FIGS. 3B–3C illustrate how a reentry vehicle may efficiently use the volume in a launch vehicle. The reentry vehicle 300 in FIG. 3B has a constant diameter over the entire cylindrical section 303. The vehicle 300 includes a nose 301, a modular section 303, and a flared conic section 302. The modular section 303 includes five modules 304a, 304b, 304c, 304d, and 304e.

FIG. 3C shows the reentry vehicle 300 positioned inside the fairing 312 of a launch vehicle. The flared section 302 is stowed, and it is not shown in FIG. 3C. The outside diameter of the modular section 303 of the reentry vehicle 300 is limited by the inside diameter of the launch vehicle fairing 312. Unlike the conical Apollo-style vehicle, 310 in FIG. 3A, reentry vehicle 300 in FIG. 3C may have the maximum diameter over the entire length of the modular section 303. In this manner, the reentry vehicle 300 makes efficient use the internal volume of the launch vehicle.

Figure 4A:
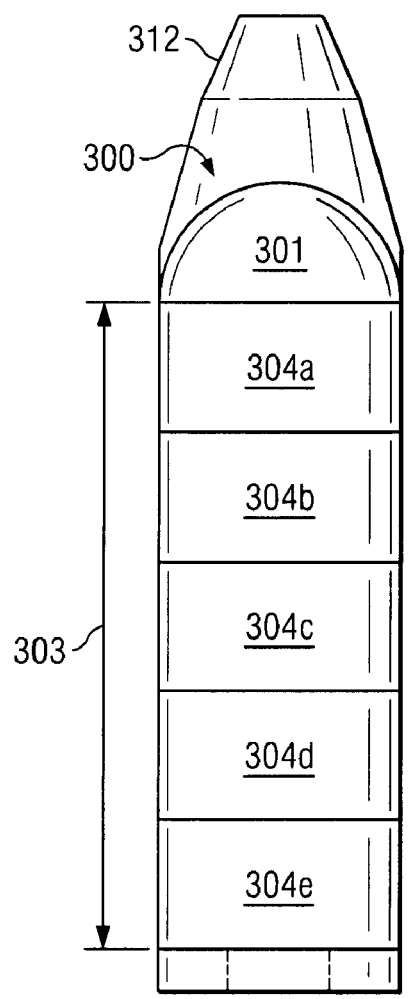
FIG. 4A shows a perspective view of one embodiment of a reentry vehicle located inside a launch vehicle fairing.
Figure 4B:
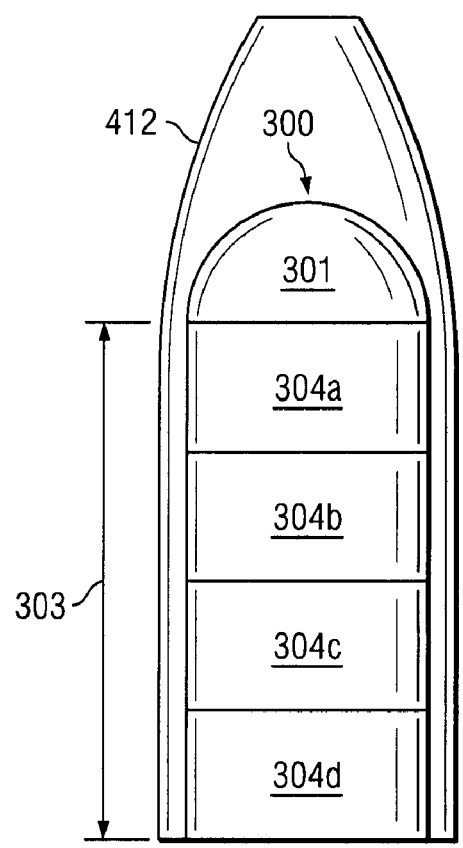
FIG. 4B shows a perspective view of one embodiment of a reentry vehicle located inside a launch vehicle fairing.

FIGS. 4A and 4B show a comparison of the reentry vehicle 300 from FIG. 3C in two different launch vehicles. In FIG. 4A, the diameter of the reentry vehicle 300 closely matches the inside diameter of the launch vehicle fairing 312. The fairing 312 may be that of a Zenit rocket, commonly used to launch payloads into space. FIG. 4B shows a section of the same reentry vehicle 300 disposed in a launch fairing 412 for a larger rocket, such as an Atlas V rocket.

A reentry vehicle 300 may have a diameter that is selected so that the reentry vehicle 300 will fit into a smaller launch vehicle fairing, such as fairing 312 in FIG. 4A. This will maximize the internal volume of the launch vehicle 312. The same reentry vehicle 300 may also be launched in a larger launch vehicle, such as the fairing 412 in FIG. 4B. While the reentry vehicle 300 does not make maximum use of the internal volume of the larger launch vehicle 412, selecting a size based on the limitations of the smallest possible launch vehicle allows for operational and logistical freedom to choose a different launch vehicle, if necessary.

Embodiments of a reentry vehicle may also be multipurpose vehicles that are capable of reentry into the Earth's atmosphere over a range of velocities, without subjecting the payload or crew to adversely large deceleration forces. Such velocities may include orbital velocities, direct lunar return velocities, as well as hyperbolic velocities, where the velocity of the reentry vehicle exceeds the escape velocity for the Earth.

Figure 5A:
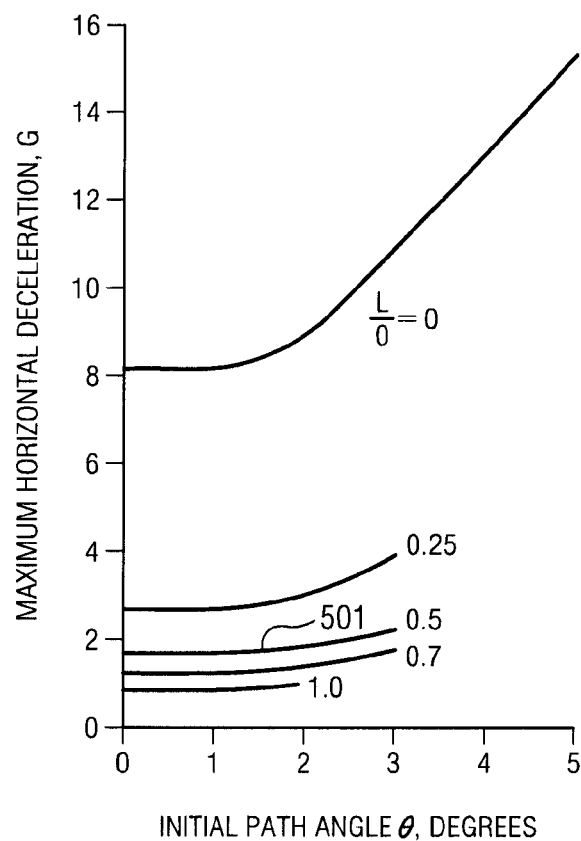
FIG. 5A shows a graph of the deceleration forces on the vertical axis as a function of reentry angle on the horizontal axis for vehicles with different L/D ratios at a near orbit velocity.

Embodiments of a reentry vehicle, as described above with reference to FIG. 1, may include a nose 101, a modular section 103, and a flared section 102. The nose 101 is connected to the modular section 103 at a first end, and the flared section 102 is positioned proximate to the aft end of the modular section 103. Such geometry may be specifically designed to provide a lift to drag ratio ("L/D ratio") of about 0.5. FIG. 5A is a graph of the deceleration forces for reentry vehicles of varying L/D ratios from a low Earth orbit. The deceleration forces are shown as a function of the initial reentry path angle. For a reentry vehicle with a L/D ratio of about 0.5, shown at 501, the maximum deceleration forces are on the order 2 g's.

Figure 5B:
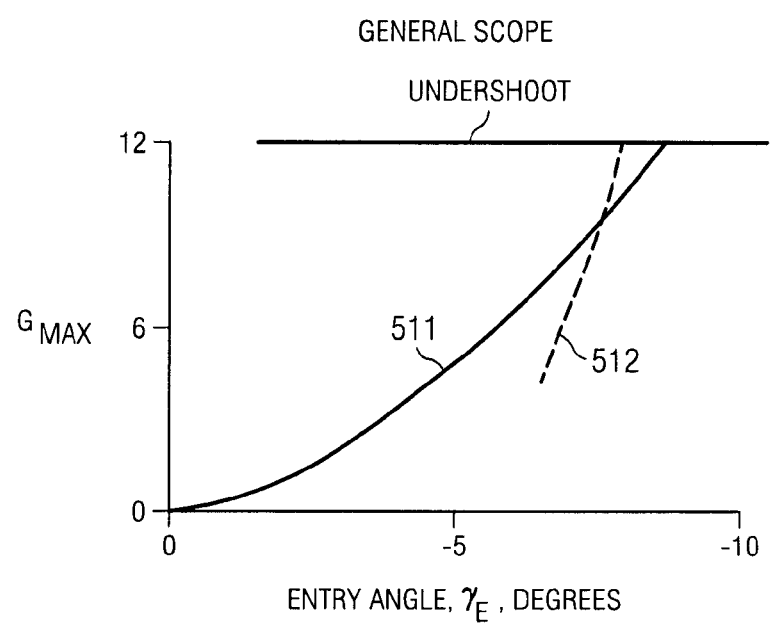
FIG. 5B shows a graph of the deceleration forces on the vertical axis as a function of reentry angle on the horizontal axis for vehicles with different L/D ratios at a hyperbolic velocity.

FIG. 5B shows the deceleration forces for a reentry vehicle with a L/D of about 0.5 at Martian return velocities of about 46,000 fps, at 511, and 26,000 fps, at 512. The deceleration forces are shown as a function of the entry angle. The maximum g-loading on a reentry vehicle is about 12 g's. Both situations have deceleration forces less than 20 g's, the maximum a human can withstand.

Figure 6A:
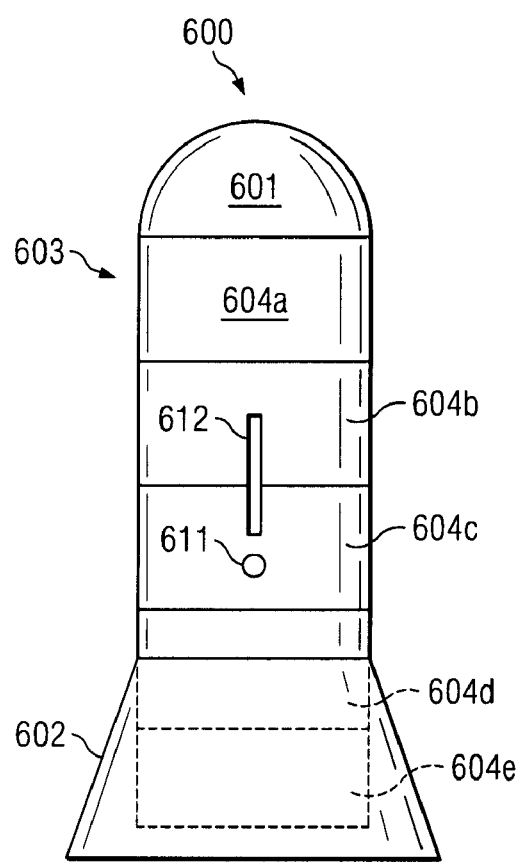
FIG. 6A shows the center of pressure and a center of gravity range for one embodiment of a reentry vehicle.
Figure 6B:
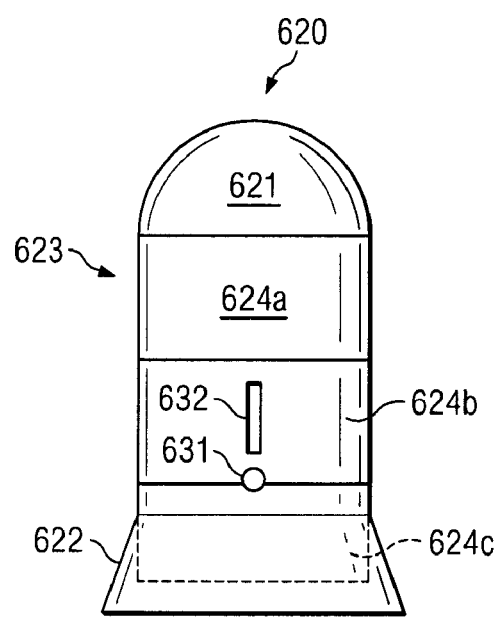
FIG. 6B shows the center of pressure and a center of gravity range for one embodiment of a reentry vehicle.

FIGS. 6A and 6B illustrate how the hypersonic aerodynamic stability of the reentry vehicle may be insensitive to changes in the vehicle's length. In general, any reentry vehicle has both a center of gravity and a center of pressure location. The center of gravity is an imaginary point representing the weight center of an object; the point about which the object balances in every direction. Similarly, the center of pressure represents the point where the aerodynamic forces balance out. The stability of an aerodynamic vehicle depends on the positioning of the center of gravity with respect to the center of pressure. In general, a stable vehicle will have a center of gravity that is forward of the center of pressure.

FIG. 6A shows an embodiment of a reentry vehicle 600 that includes a nose 601, a modular section 603, and a flared section 602. The modular section 603 is comprised of five modules 604a, 604b, 604c, 604d, 604e. The position of the center of pressure, shown at point 611, is largely based on the size of the modular section 603 and the design of the flared section 602. In general, the larger the flare in the flared section 603, the farther toward the rear the center of pressure will be located. Through careful design, the center of pressure may be positioned in the rear of the vehicle 600, proximate to the flared section 602.

FIG. 6A also shows a range 612 for the center of gravity. The center of gravity must be represented by a range 612 because it is impossible to predict the position and density of all payloads without specific information that is not available when a reentry vehicle is designed. Thus, the exact position of the center of gravity cannot be precisely known and must be shown as a range of the possible locations, from an empty to a fully loaded vehicle. The point in the range 612 closest to the flared section 602 represents the location of the center of gravity when the reentry vehicle 600 is empty. In this position, the center of gravity will be forward of the center of pressure 611. As the vehicle is loaded, the center of gravity will move forward in the range 612. Thus, for most conceivable loads, the entire range 612 for the center of gravity will be forward of the center of pressure 611, thereby providing a reentry vehicle 600 with hypersonic stability and that is substantially insensitive to payload mass variations.

FIG. 6B shows a reentry vehicle 620 that is similar to the vehicle 600 in FIG. 6A, but the vehicle 620 in FIG. 6B is shorter in length. The reentry vehicle 620 include a nose 621, a modular section 623, and a flared section 622. The modular section 623 includes two modules 624a, 624b that are visible above the flared section 622 and a third cylindrical section 624c not entirely visible beneath the flared section 622. By careful design and selection of the flared section 622, the center of pressure 631 may be located behind the range 632 for the center of gravity. Thus, the center of gravity, for most conceivable loads, will be forward of the center of pressure 631, thereby providing a reentry vehicle 620 with hypersonic stability and general insensitivity to payload mass variations. It is noted that the vehicles 600 and 620 are comprised of common elements, the only variation being the number of modular sections 604 and 624 and the size of the flared sections 602 and 622.

Figure 6C:
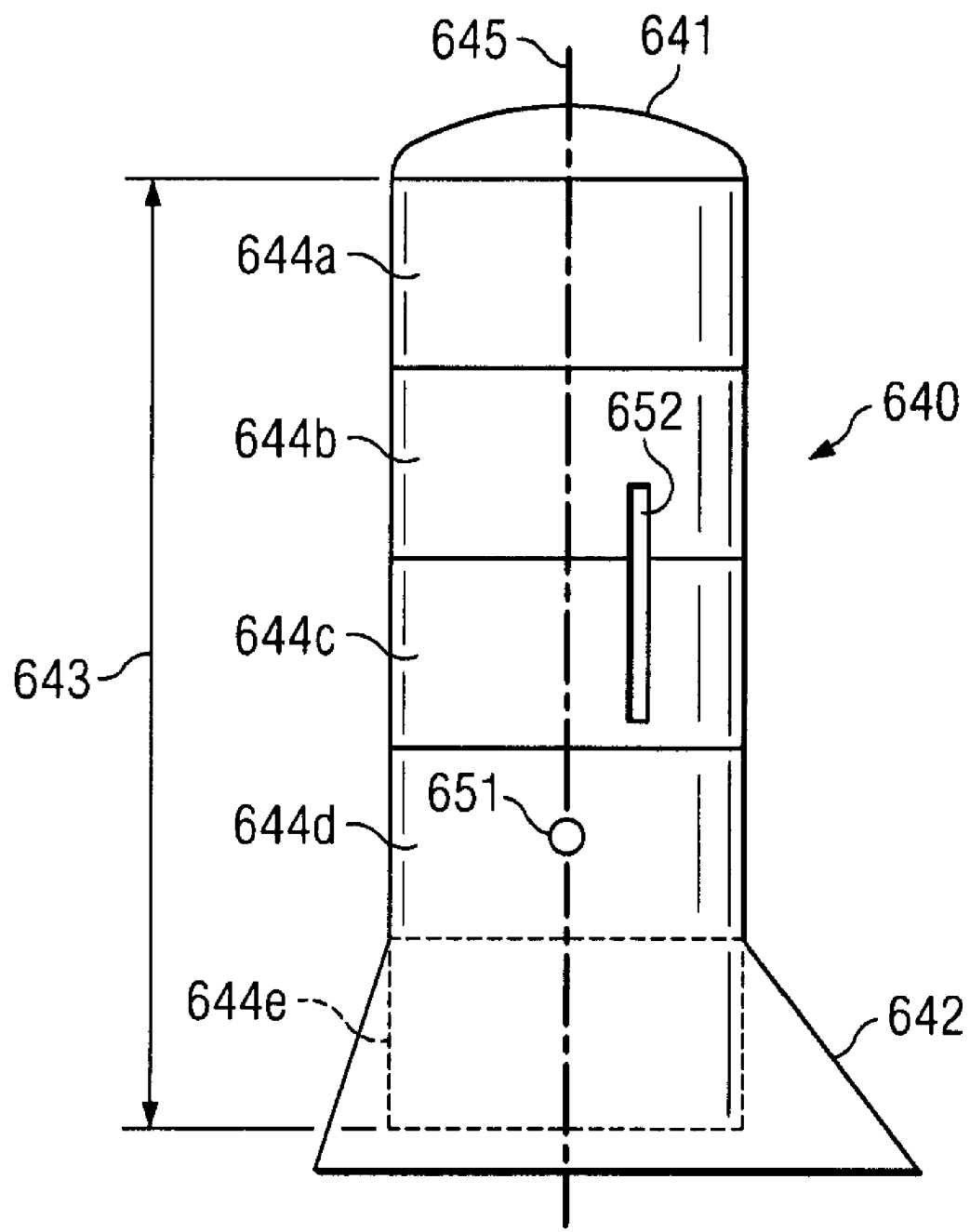
FIG. 6C shows the center of pressure and a center of gravity range for one embodiment of a reentry vehicle.

FIG. 6C shows one embodiment of a reentry vehicle 640 that includes a nose 641, a modular section 643 that includes five modules 644a, 644b, 644c, 644d, 644e, and a flared section 642. The aft module 644e is under the flared section 642 and is shown in dashed lines in FIG. 6C. The reentry vehicle 640 has a center of pressure 651 and a range 652 for the center of gravity. The range 652, however, is not located along the centerline 645 of the vehicle 652. This may be desirable to orient the vehicle during reentry.

With an offset center of gravity, such as the range 652 shown in FIG. 6C, the reentry vehicle will tend to orient itself so that the center of gravity is below the centerline 645, with respect to gravity. Essentially, once the reentry vehicle encounters the atmosphere, the vehicle will orient itself so that the center of gravity is closest to the Earth. In some embodiments, the heat shielding, called a thermal protection system ("TPS"), may be applied to the side of the vehicle that will be oriented downward during reentry.

The offset center of gravity will also cause the reentry vehicle to pitch slightly upward, providing lift to the vehicle 640. Lift will reduce the deceleration forces, and thus the heat load, that acts on the vehicle during reentry.

FIG. 6C also shows an asymmetrical flared section 642. Such a flared section 642 may be specifically designed to suit the aerodynamics of a particular mission. For example, in a vehicle 640 with an offset center of gravity range 652, an asymmetrical flared section 642 may be designed to limit the pitching of the vehicle 640 so that the nose 641 will absorb most of the heat loading during reentry. The specific design of an asymmetrical flared section 642 may balance the lift with the allowable heat loading that occurs away from the nose 641.

In some embodiments, an asymmetrical flared section 642 may represent one configuration of a variable geometry flared section. For example, an inflatable bladder may be used to position the flared section in a desired geometry. In addition, on-board guidance systems may be configured to adapt the geometry of the flared section during reentry. In another example, the flared section may be comprised of panels that may be actuated to form the desired geometry. In yet another example, a flared section may include ribs or spines that may be actuated to control the geometry of the flared section.

During the launch, or the ascent, of a reentry vehicle, it may be desirable for the center of gravity of the reentry vehicle to be close to the centerline of the vehicle. In order to achieve the offset center of gravity, as shown for example in FIG. 6C, it may be necessary to manipulate the payload or other mass within the vehicle so that the center of gravity becomes offset.

The ability to manipulate the center of gravity during flight or reentry allows additional control of the vehicle. As described earlier, an offset center of gravity will orient the vehicle and cause it to pitch and have lift. The exact position of the center of gravity, including the distance from the centerline, will control the orientation of the vehicle and the extent of the pitch and lift.

Figure 7A:
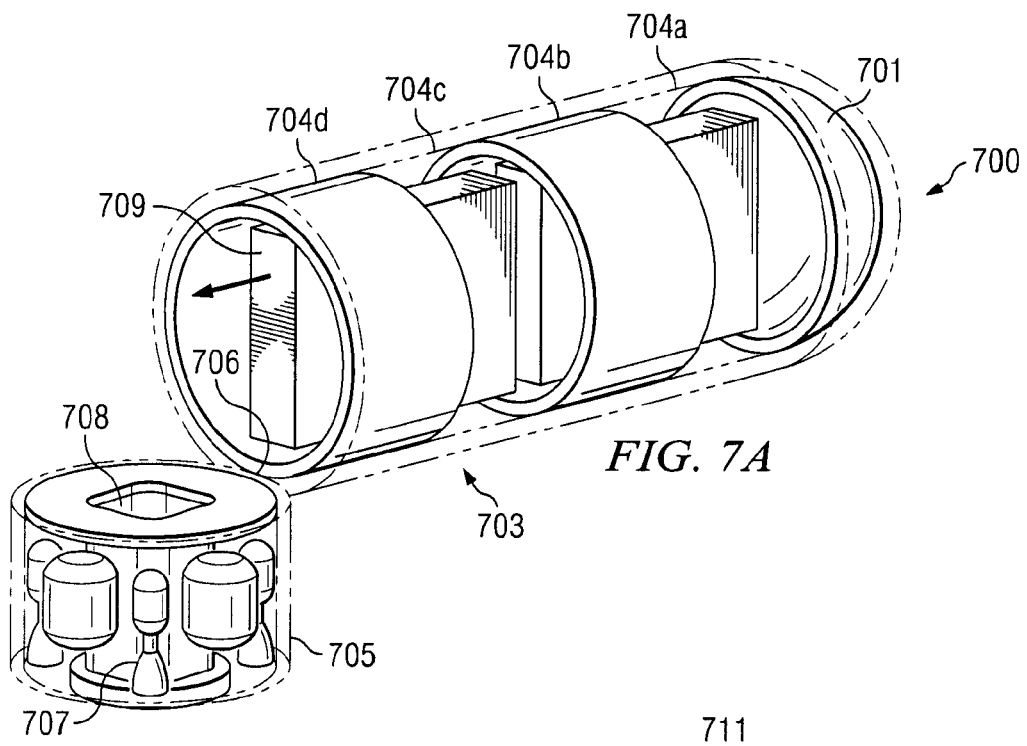
FIG. 7A shows a perspective view of one embodiment of a reentry vehicle.

FIG. 7A shows a perspective view of an embodiment of a reentry vehicle 700 that includes a nose 701 and a cylindrical section 703. The flared section is not shown in FIG. 7A because it is stowed. The modular section 703 shown in FIG. 7A is comprised of four modules 704a, 704b, 704c, 704d that are connected together to form an air-tight modular section 703.

The reentry vehicle 700 also includes an aft section 705. An aft section 705 may be an additional module that is specially equipped and configured for being at the aft end of the reentry vehicle 700. An aft section may also be formed from something other than a cylindrical module. In FIG. 7A, the aft section 705 is attached to the rear-most cylindrical module 704d in the modular section 703 by a hinge 706. The aft section 705 is shown in an open position, but it may be moved between the open position and a closed position. The aft section 705 may also include propulsion and maneuvering systems 707, as well as a crew hatch and tunnel 708.

In the closed position (not shown), the reentry vehicle 700 may be pressurized in the interior. The nose 701 and each of the modules 704a–d are connected to form air-tight seals between them. By closing the aft section 705 to form an air-tight seal, the reentry vehicle 700 may be pressurized.

The hinged aft section 705 enables the reentry vehicle 700 to deploy or capture a payload 709 through the open aft section of 703. Once the payload 709 is secured or released from the reentry vehicle 700, the cylindrical section 703 may be closed, and the reentry vehicle may be pressurized. This will allow astronauts to work on the payload in a pressurized environment that does not require space suits. Space suits are bulky, difficult to maneuver in, and typically include large gloves that only allow the most basic hand movements. Working in a pressurized enclosure will enable crew to work without the need for a space suit, thereby allowing a much wider range of human motions for working with payloads.

Figure 7B:
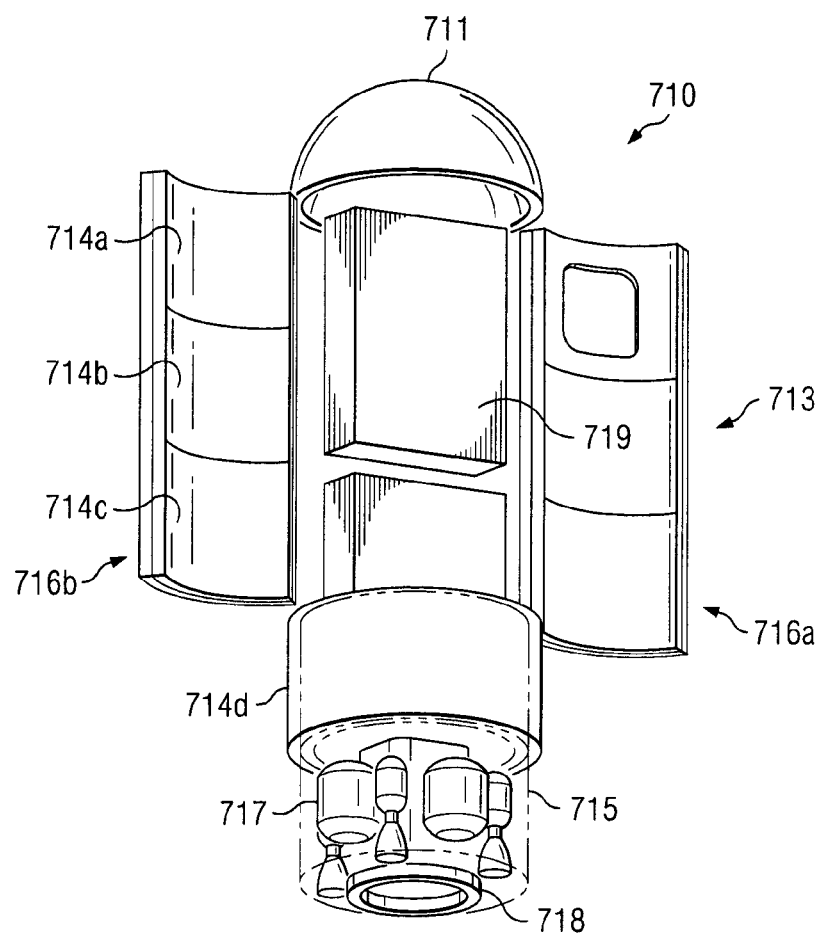
FIG. 7B shows a perspective view of one embodiment of a reentry vehicle.

FIG. 7B shows another embodiment of a reentry vehicle 710 that includes a nose 711, a modular section 713, and an aft section 715. The modular section 713 shown in FIG. 7B is comprised of four modules 714a, 714b, 714c, 714d. The aft section 715, which may be a specialized cylindrical module, may include propulsion and maneuvering equipment 717 and a hatch and tunnel 718 for crew access. It is also noted that a deployed flared section is not shown in FIG. 7B since it is stowed.

The modular section 713 also includes two payload bay doors 716a, 716b, shown in the open position. The payload bay doors 716a, 716b are formed from hinged sections in three of the modules 714a, 714b, 714c. The fourth cylindrical module 714d may not include hinged sections since the deployable flared conic section is stowed on the periphery of the cylindrical module 714d. In addition, the modular nature of the reentry vehicle 710 enables not only selection of the length of the vehicle 710, but selection of the size of the bay doors 716a, 716b as well. For example, a larger door may be selected and implemented by using more than three modules with hinged sections. Likewise, smaller bay doors may be designed using fewer than three modules with hinged sections. The number and position of the modules and hinged sections is not intended to be limiting.

In operation, the bay doors 716a, 716b may be opened to receive a payload 719. Upon closing, the bay doors 716a, 716b may form an air-tight seal, and the reentry vehicle 710 may be pressurized to enable personnel to work on the payload 719 without spacesuits. In other cases, the payload 719 may be returned to Earth. In the case where repairs are performed in orbit, the bay doors 716a, 716b may be re-opened upon completion of the repairs, and the payload 719 may be re-deployed. In addition, a payload 719 may be launched in the reentry vehicle 710, and the bay doors 716a, 716b may be opened to deploy the payload 719.

Figure 7C:
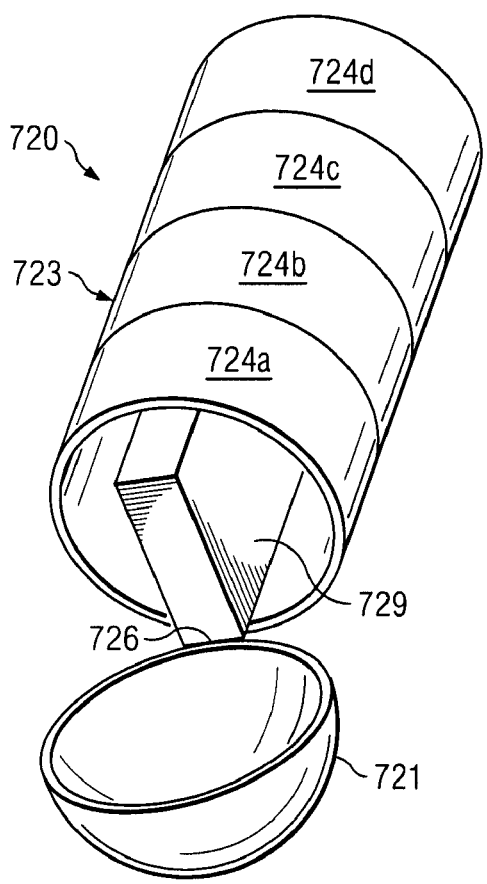
FIG. 7C shows a perspective view of one embodiment of a reentry vehicle.

FIG. 7C shows another embodiment of a reentry vehicle 720 having a nose 721 and a modular section 723. It is noted that the deployable flared section is stowed in FIG. 7C. The modular section 723 shown in FIG. 7C is comprised of four modules 724a, 724b, 724c, 724d. The aft cylindrical module 724d may serve as a propulsion module similar to the aft section 715 in FIG. 7B.

The nose 721 in FIG. 7C is connected to the modular section 723 by a hinge 726. The nose 721 is shown in an open position. With the nose 721 in the open position, a payload 729 may be retrieved or deployed. In one embodiment, the nose 721 may be closed and sealed so that the reentry vehicle 720 may be pressurized.

Figure 7D:
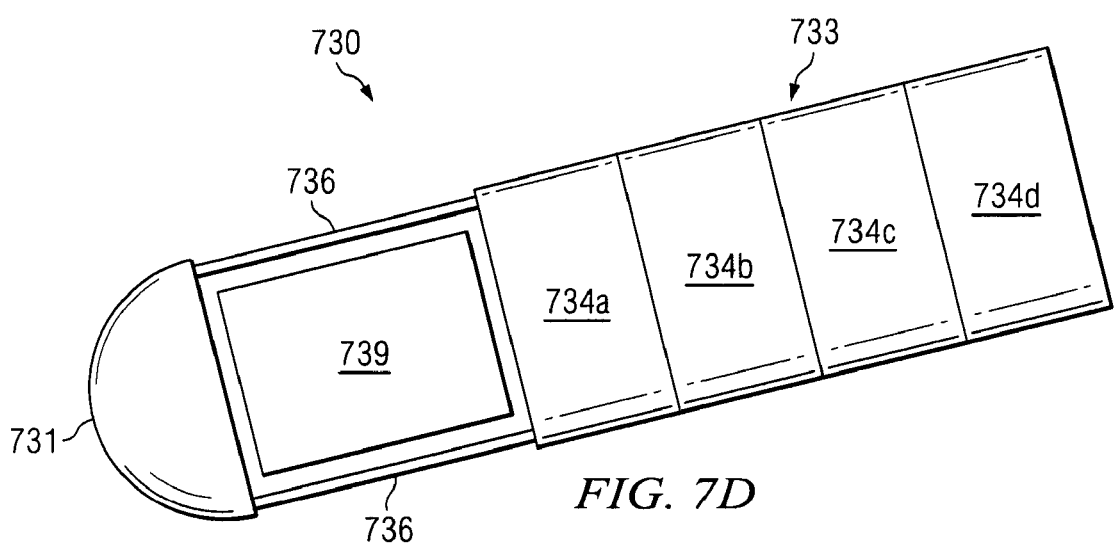
FIG. 7D shows a perspective view of one embodiment of a reentry vehicle.

FIG. 7D shows another embodiment of a reentry vehicle 730 that includes a nose 731 and a modular section 733. It is noted that the deployable flared section is stowed. The modular section 733 shown in FIG. 7D is comprised of four modules 734a, 734b, 734c, and 734d. The aft cylindrical module 734d may serve as a propulsion module similar to the aft section 715 in FIG. 7B.

In FIG. 7D, the nose 731 is connected to the modular section by rails 736. In some embodiments, the rails 736 are powered rails that are able to move the nose 731 between an open position, which is shown in FIG. 7D and a closed position (not shown). In at least one embodiment, when in the open position, the rails 736 extend to a position that enables a payload 739 to have clear access to the cargo area inside the vehicle 730. The payload 739 may be captured or deployed. When in the closed position, the nose 731 seals with the modular section 733 so that the reentry vehicle 730 may be pressurized.

Figure 7E:
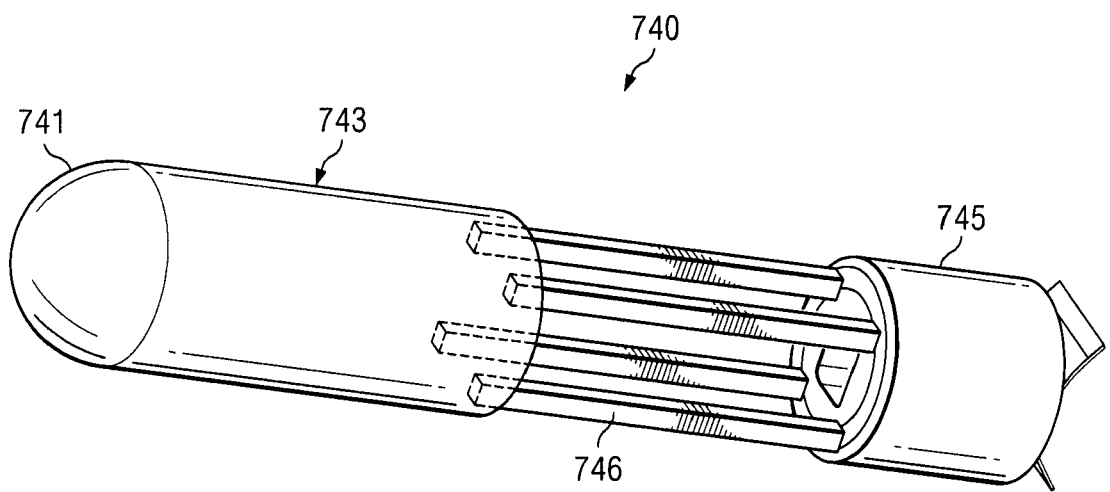
FIG. 7E shows a perspective view of one embodiment of a reentry vehicle.

FIG. 7E shows another embodiment of a reentry vehicle 740 that includes a nose 741, a modular section 743, and an aft section 745. For clarity and ease of understanding, the individual modules are not shown in FIG. 7E. The reentry vehicle 740 includes rails 746 that are attached to the aft end 745. The one or more of the modules in the modular section 743 and the nose 741 may slide on the rails 746 between an open position, which is shown in FIG. 7E, and a closed position (not shown). In some embodiments, the rails 746 may be powered for ease of movement. In the open position, a payload (not shown) may be passed between the rails 746 and into or out of the cargo area of the vehicle 740. Retrieval and deployment of a payload may be accomplished in this manner. In the closed position of at least one embodiment, the modular section 743 forms a seal with the aft section 745 so that the cargo area may be pressurized.

Figure 7F:
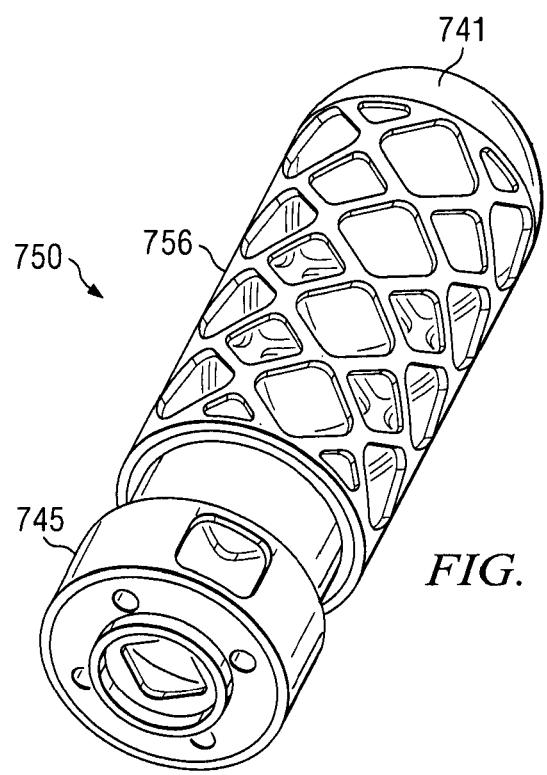
FIG. 7F shows a perspective view of one embodiment of a reentry vehicle.

FIG. 7F shows an embodiment of a reentry vehicle 750 that is similar to the embodiment 740 in FIG. 7E, except that the vehicle 750 in FIG. 7F also includes a perforated cylinder 756 or structure that is positioned inside a modular section. It is noted that the rails and the modular section are not shown in FIG. 7F for clarity. The perforations in the perforated cylinder 756 may be sized to accommodate the largest payload that would be carried in the vehicle 750. Thus, in the open position, which may be achieved similar to that described with reference to FIG. 7E, a payload may be retrieved or deployed through the perforated cylinder 756. In the closed position (not shown), the modular section 743 may form a seal with the aft section 745 such that the interior cargo section of the vehicle 750 may be pressurized.

Figure 7G:
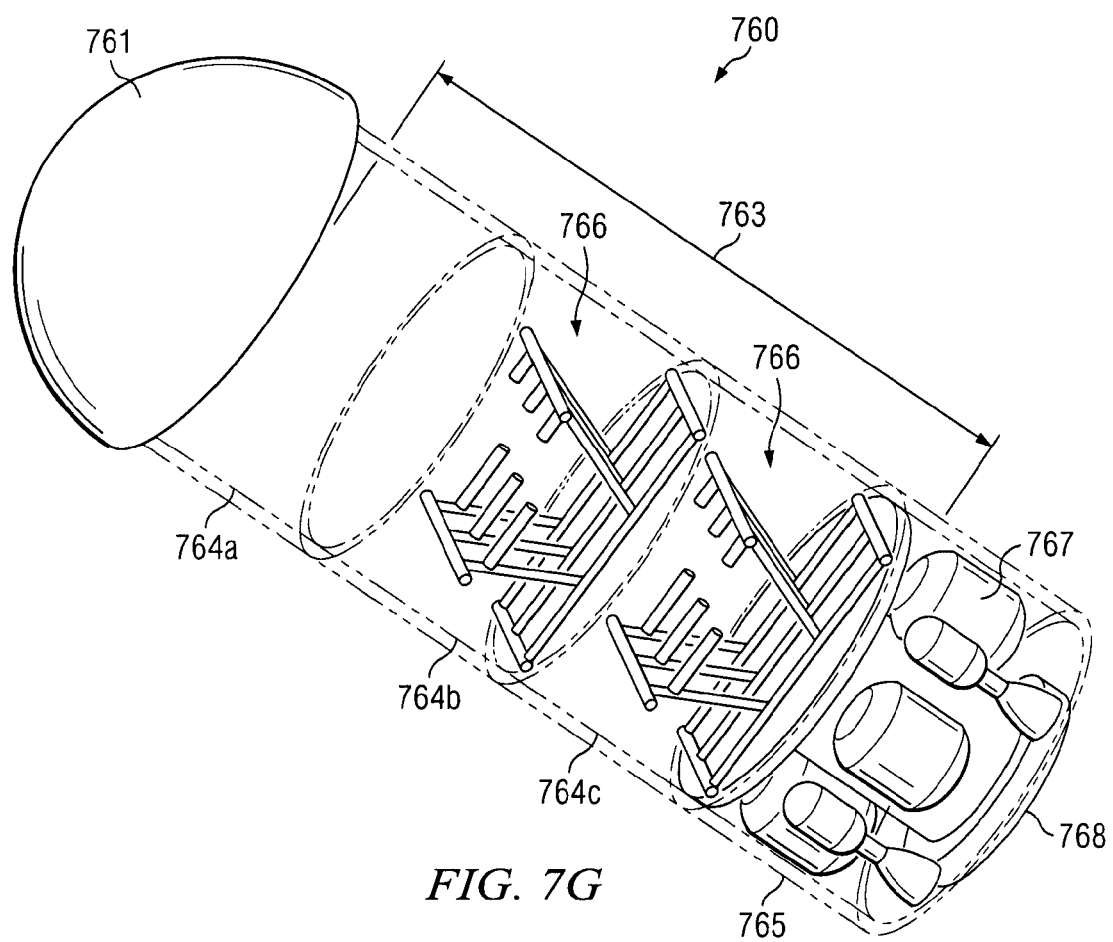
FIG. 7G shows a perspective view of one embodiment of a reentry vehicle.

FIG. 7G shows a cutaway of another embodiment of a reentry vehicle 760. The reentry vehicle 760 includes a nose 761, a modular section 763, and an aft section 765. The aft section 765 may include propulsion and maneuvering systems 767 and a hatch and tunnel 768 for crew access. It is noted that a flared section is stowed. The modular section 763 shown in FIG. 7G is comprised of three modules 764a, 764b, 764c. The aft section 765 may comprise a specialized cylindrical module.

The cargo area 766 of the vehicle 760 is configured to include crew accommodations so that crew may be transported to and from orbit. In a preferred embodiment, all of the sections are sealingly coupled so that the interior of the vehicle 760 may be pressurized. The vehicle size may be selected based on the number of crew to be transported. For example, for additional capacity, additional modules with crew accommodations may be included in a vehicle.

Figure 8A:
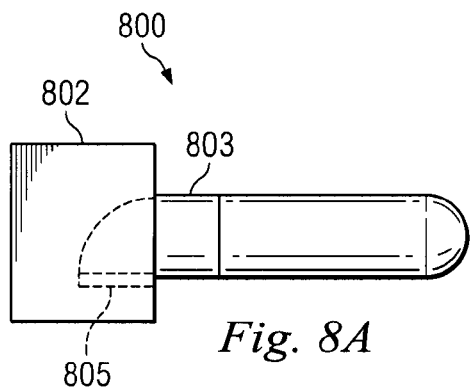
FIG. 8A shows a schematic of a payload transfer procedure in a closed and pressurized stage.

FIGS. 8A–8E show schematically how crew members may access a payload 809 from a space station 802. FIGS. 8A–8E show an embodiment of a reentry vehicle 800 that is similar to the embodiment shown in FIG. 7A. The vehicle 800 in FIGS. 8A–8E is docked with a space station 802 by a docking mechanism 803 at the aft end of the vehicle 800. FIG. 8A shows the vehicle 800 in a closed position and pressurized. A hatch 805 is open to the interior of the space station 802, allowing crew on the space station 802 to access the interior of the vehicle 800.

Figure 8B:
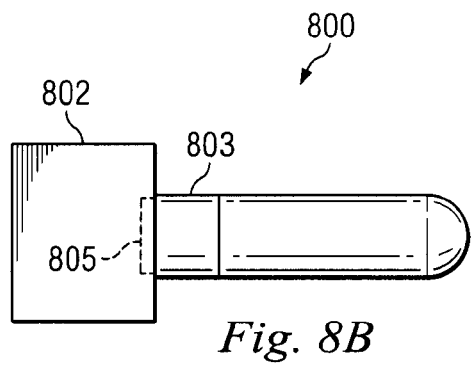
FIG. 8B shows a schematic of a payload transfer procedure in a closed and depressurized stage.
Figure 8C:
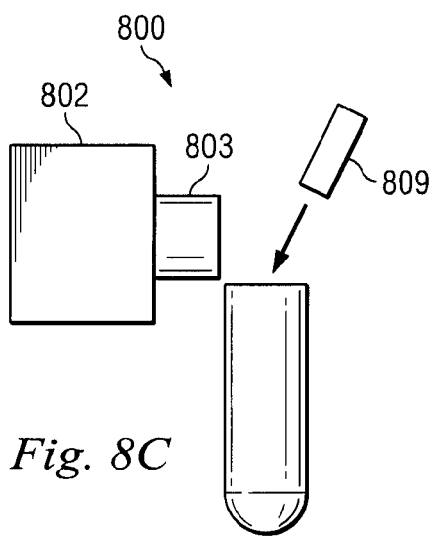
FIG. 8C shows a schematic of a payload transfer procedure in an open and deployment or capture stage.

FIG. 8B shows the vehicle 800 depressurized. This may be accomplished using any means known in the art. For example, a depressurization valve (not shown) may be opened so that the interior of the vehicle 800 is vented to space. The hatch 805 is closed to prevent air from escaping the space station 802 through the reentry vehicle 800 when it is depressurized. This will protect the pressurized environment on the space station 802. FIG. 8C shows the vehicle 800 in an open position. In the open position, the vehicle 800 may retrieve or deploy a payload 809. The reentry vehicle may be opened using a hinge connected between the aft or docking section 803 and the modular section of the vehicle 800.

Figure 8D:
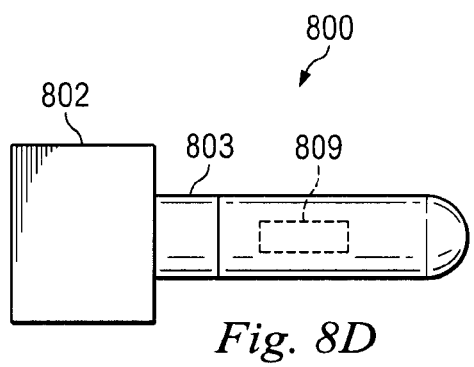
FIG. 8D shows a schematic of a payload transfer procedure in a closed and depressurized loaded or unloaded stage.
Figure 8E:
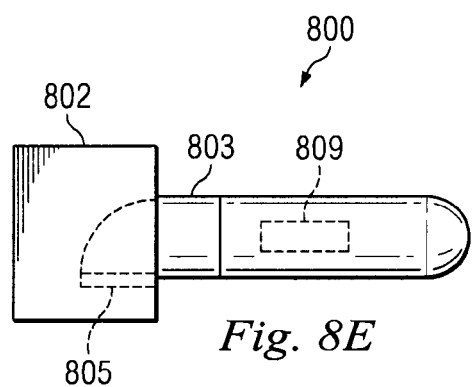
FIG. 8E shows a schematic of a payload transfer procedure in a closed and pressurized loaded or unloaded stage.

Once the payload 809 is secured in the vehicle 800, the vehicle may be closed, as shown in FIG. 8D. The hinged section is moved back to the closed position, and the sections are sealed again so that the interior of the reentry vehicle is air-tight. FIG. 8E shows the vehicle 800 is pressurized. The hatch 805 may be opened so that crew on the space station 802 may access the payload 809 in the vehicle 800. Because the vehicle 800 is pressurized, crew may access the payload 809 without the need for bulky space suits.

Figure 8F:
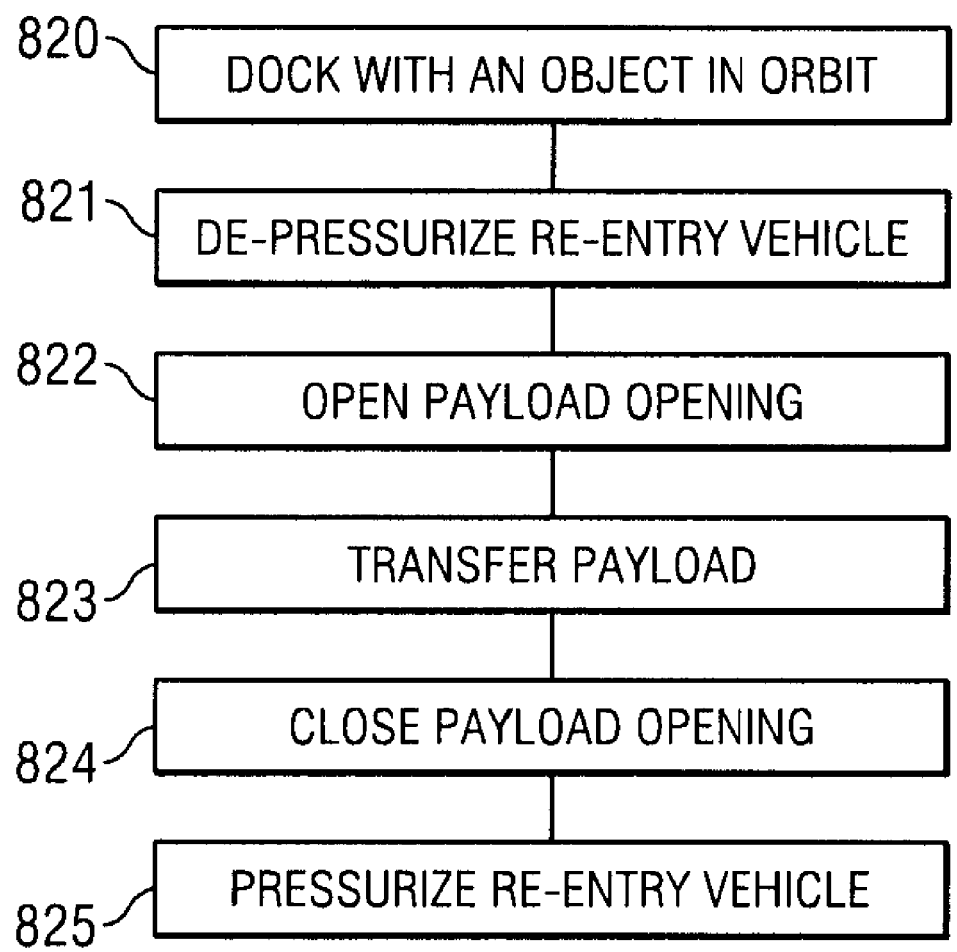
FIG. 8F shows one embodiment of a method for transferring a payload.

FIG. 8F shows one embodiment of a method for capturing or deploying a payload. The method includes docking a reentry vehicle with an object in space, at step 820. In a preferred embodiment, the object is in orbit around the Earth. Next, the method may include depressurizing the reentry vehicle, if it is originally pressurized, at step 821. The method may next include opening a payload opening in the reentry vehicle, at step 822. Opening a payload opening may be accomplished, for example, by any of the above described methods. Other methods may also be devised.

The method may next include transferring a payload by capturing or deploying the payload, at step 823. This may be done in any manner known in the art. For example, a robotic arm may be used to move the payload. Next, the method may include closing the payload opening, at step 824, and re-pressurizing the reentry vehicle, at step 825.

FIGS. 8A–E show a payload being captured, but a reentry vehicle and a method for transferring a payload may also be used to deploy a payload. Similar steps may be used to depressurize, open, close, and repressurize the reentry vehicle.

Figure 9A:
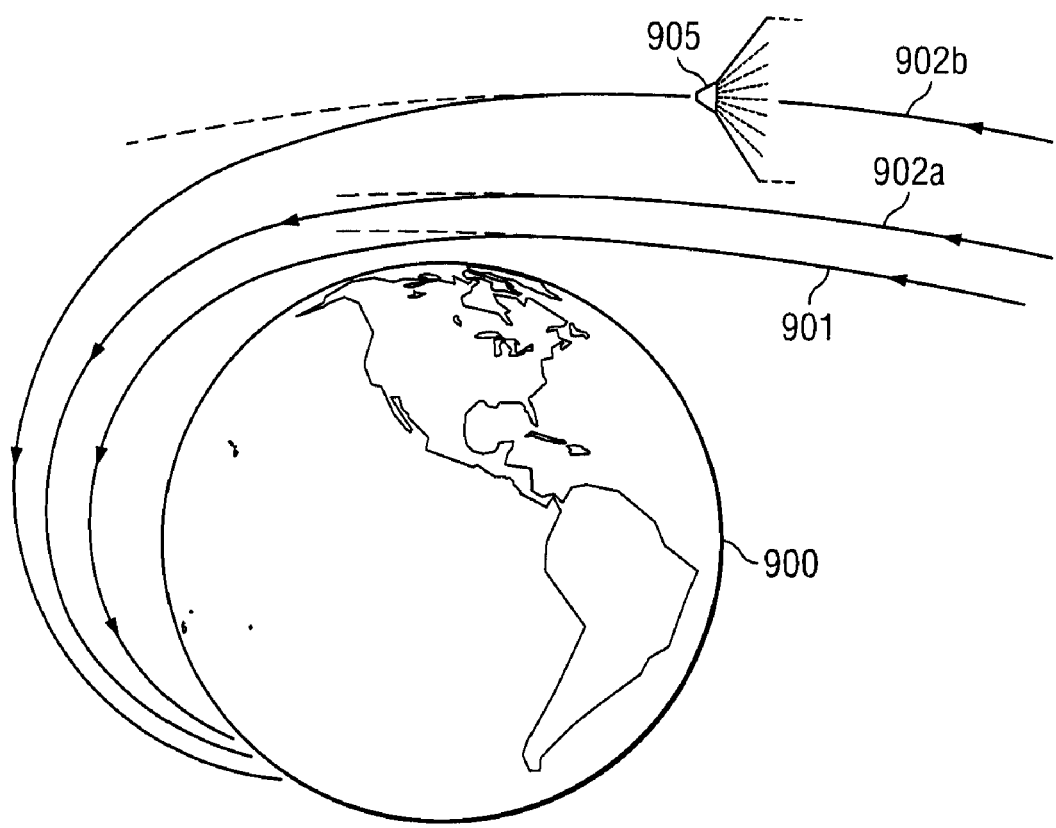
FIG. 9A shows an entry corridor enlargement for one embodiment of a reentry vehicle.

FIG. 9A shows how the entry corridor for a vehicle reentering at hyperbolic velocity may be enlarged using a reentry vehicle with a variable geometry flared conic section or two-stage conic section. Line 901 represents the undershoot boundary. Below the undershoot boundary, lift from the vehicle is utilized to place the reentry vehicle on the correct path to prevent too rapid deceleration of the vehicle in the atmosphere of the Earth 900. The heat and deceleration forces generated during an undershoot reentry would be too much for a reentry vehicle to withstand. Line 902*a* represents the nominal overshoot boundary provided by a vehicle with only variable lift. Above the overshoot boundary, the reentry vehicle may be in danger of skipping off the atmosphere and returning to space. Thus, for a conventional lifting reentry vehicle, reentry may only be accomplished in the "window" between the undershoot boundary and the overshoot boundary 902*a*.

For certain embodiments of a reentry vehicle shown herein, the nominal overshoot boundary 902*a* may be extended to an enhanced overshoot boundary, shown at line 902*b*. That is, the reentry vehicle expands the reentry parameters that would otherwise prevail. In some embodiments this may be accomplished using a flared section with a variable geometry, as will be described in more detail with reference to FIG. 11B. The flared section may be positioned to have a larger diameter. In doing so, the drag of the reentry vehicle will be increased so that much of the kinetic energy of the reentry vehicle is dissipated in the rarefied air of the upper atmosphere, shown at 905. Once the vehicle slows to a desired velocity, the variable geometry flared section may be positioned to have a smaller size so that it may perform the stabilizing function for the remainder of the reentry flight. By dissipating kinetic energy in the less dense rarefied atmosphere, there will be less energy converted into heat over the remainder of the reentry process. Thus, even for a reentry that begins above the nominal overshoot boundary, the additional loss of kinetic energy in the rarefied atmosphere will reduce the heat load over the remainder of the reentry to an acceptable level.

Similarly, a two-stage flared section may be used. The first stage may be larger to provide the necessary drag in the rarefied air of the upper atmosphere. Once the vehicle slows, the first stage may be discarded. The second stage may be smaller so that it may perform the stabilization function for the remainder of the reentry.

As illustrated in FIG. 9A, the enhanced reentry corridor, between 901 and 902*b*, is larger than the nominal entry corridor, between 901 and 902*a*. Even for a reentry path that is along line 902*b*, the large size of the flared section may slow the reentry vehicle in the rarefied atmosphere so that the heat loading will be acceptable as the reentry vehicle slows in the dense atmosphere. In some embodiments, the enhanced reentry corridor may be as much as five times as wide as the nominal reentry corridor.

Figure 9B:
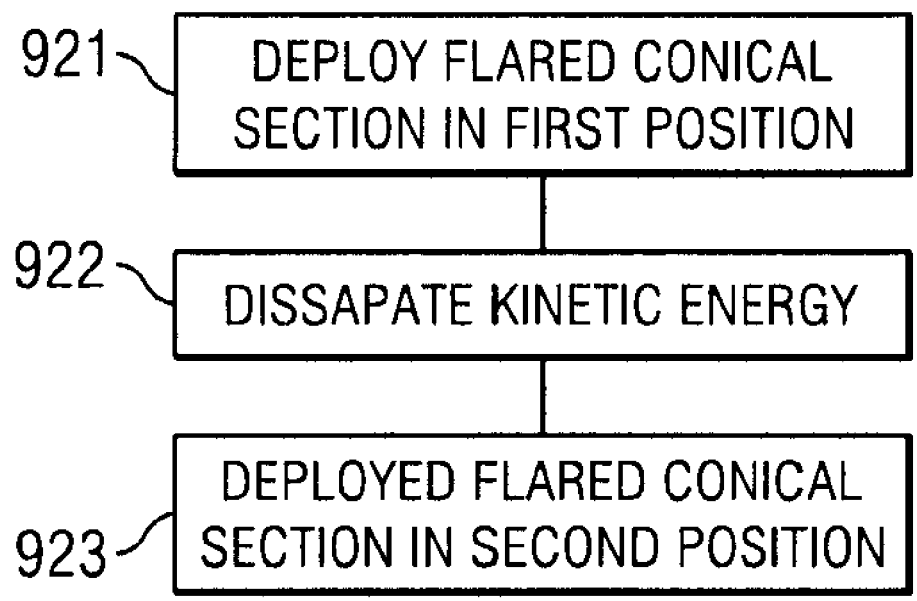
FIG. 9B shows one embodiment of a method for entering a planetary atmosphere.

FIG. 9B shows one embodiment of a method for reentering the Earth's atmosphere. The method includes deploying a flared section in a first position, at step 921. The method may next include dissipating kinetic energy in the rarefied air of the upper atmosphere, at step 922. The method may then include deploying the flared section in a second position, at step 923. In some embodiments, the first position of the flared section has a greater cross sectional area than the second position. These positions are explained further with respect to FIGS. 11A and 11B.

In addition, in some embodiments, the reentry vehicle approaches the Earth above the overshoot boundary for the vehicle, when the vehicle has the flared section in the second position. The second position may have advantages for later in the reentry process, but the second position would also correspond to a narrow reentry corridor. By using a first position for the flared section, the reentry corridor may be widened, as shown in FIG. 9A, and the flared section may be reconfigured into the second position for later stages of reentry. In such embodiments, a reentry vehicle may have a wide reentry corridor and still have the aerodynamic advantages of a smaller flared section during later portions of the reentry.

The method is also not restricted to reentering the Earth. A reentry method may be used to enter the atmosphere of any planetary body that has an atmosphere, such as the planets Venus or Mars.

Figure 10:
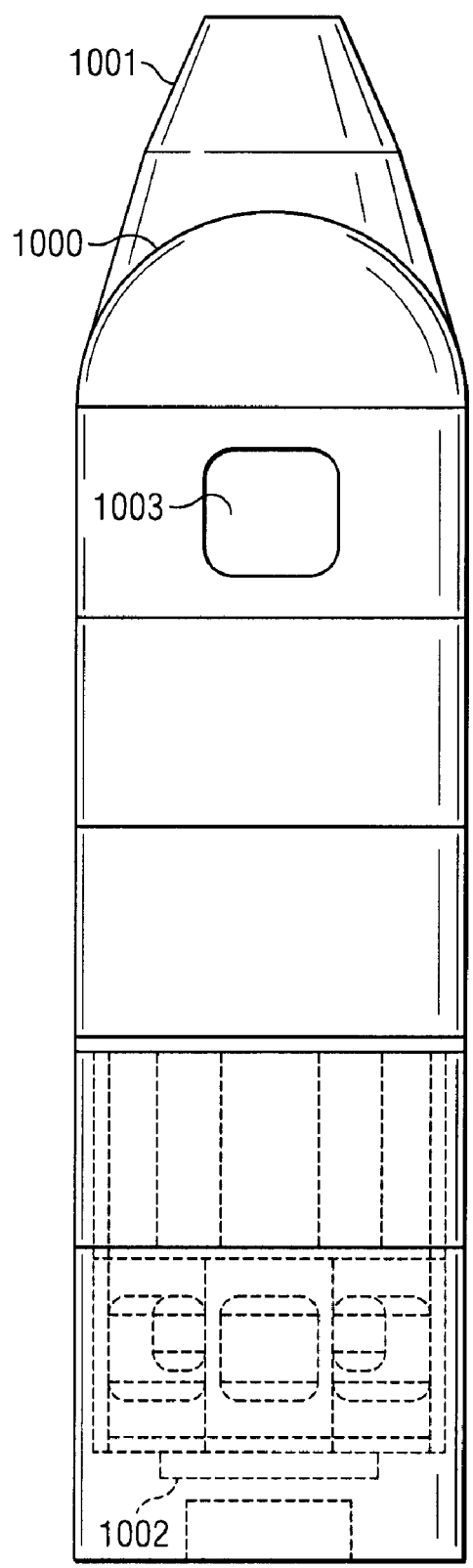
FIG. 10 shows a view of one embodiment of a reentry vehicle.

FIG. 10 shows another embodiment of a reentry vehicle 1000. The reentry vehicle 1000 is positioned in the fairing 1001 of a launch vehicle. At the aft end, the reentry vehicle 1000 includes a Common Berthing Mechanism ("CBM") 1002. A CBM is used on the International Space Station ("ISS"), and by including a CBM 1002 on the reentry vehicle 1000, the vehicle 1000 will be able to dock with the ISS. In another example, if the reentry vehicle 1000 were required to dock with an ISS truss, the CBM 1002 may be replaced with a Payload Common Attach System ("PCAS") for docking with an ISS truss. Alternatively, the reentry vehicle 1000 may be fitted with a Soyuz probe and drogue docking mechanism for docking with a Russian space vehicle. Any docking or berthing mechanism may be included as needed. In some embodiments, for example for a mission requiring no docking, a reentry vehicle may not include any docking or berthing mechanisms at all.

The reentry vehicle 1000 and the launch vehicle fairing 1001 in FIG. 10 include an access port, shown at 1003. The access port 1003 will enable access to the payload or crew inside the reentry vehicle 1000, even on the launch pad in the moments before launch. This will enable last minute changes to be made quickly and easily.

Figure 11A:
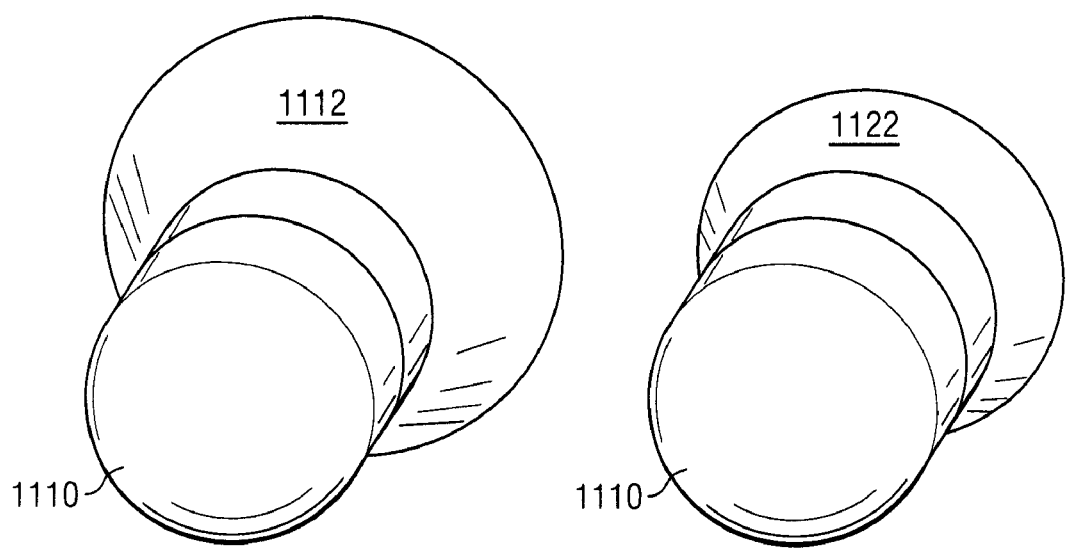
FIG. 11A shows a perspective view of one embodiment of a reentry vehicle with an adjustable geometry flared section in different positions.

FIG. 11A shows a reentry vehicle 1110 in two different configurations. In one example, the vehicle includes an adjustable geometry flared conic section that may be positioned in a first geometry, shown at 1112, and in a second geometry, shown at 1122. In another example, the vehicle 1110 includes a two-stage flared conic section, where 1112 represents the larger first stage, and 1122 represents the smaller second stage.

A variable geometry flared conic section and a two-stage flared conic section may be used to enlarge the reentry geometry, as described above with reference to FIG. 9. In addition, a variable geometry flared conic section and a two-stage flared conic section may be used to vary the ballistic coefficient of the vehicle 1110 during reentry. This may be necessary because it is often the case that the reentry mass is not well known before launch. In these cases, the ballistic coefficient may be modulated to control the reentry flight path.

Figure 11B:
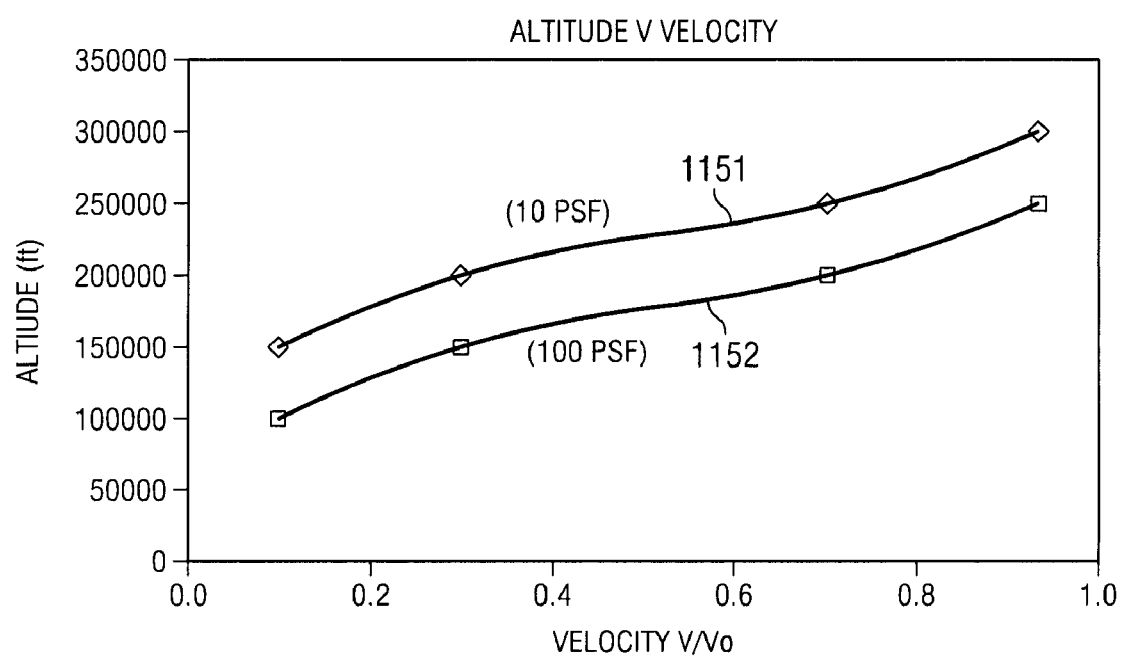
FIG. 11B shows a graph of altitude versus velocity for reentry vehicles with two different ballistic coefficients.

A larger cross sectional area 1112 provides a lower ballistic coefficient and a slower velocity at a higher altitude. A smaller cross sectional area 1122 provides a higher ballistic coefficient and a faster velocity at a lower altitude. This principle is shown in FIG. 11B, which shows the velocity/altitude curve for a reentry vehicle with a ballistic coefficient of 10 psf 1151 and the velocity/altitude curve for a reentry vehicle with a ballistic coefficient of 100 psf 1152. The lower ballistic coefficient 1151 has a slower velocity at a higher altitude than that of the higher ballistic coefficient 1152.

Figure 12:
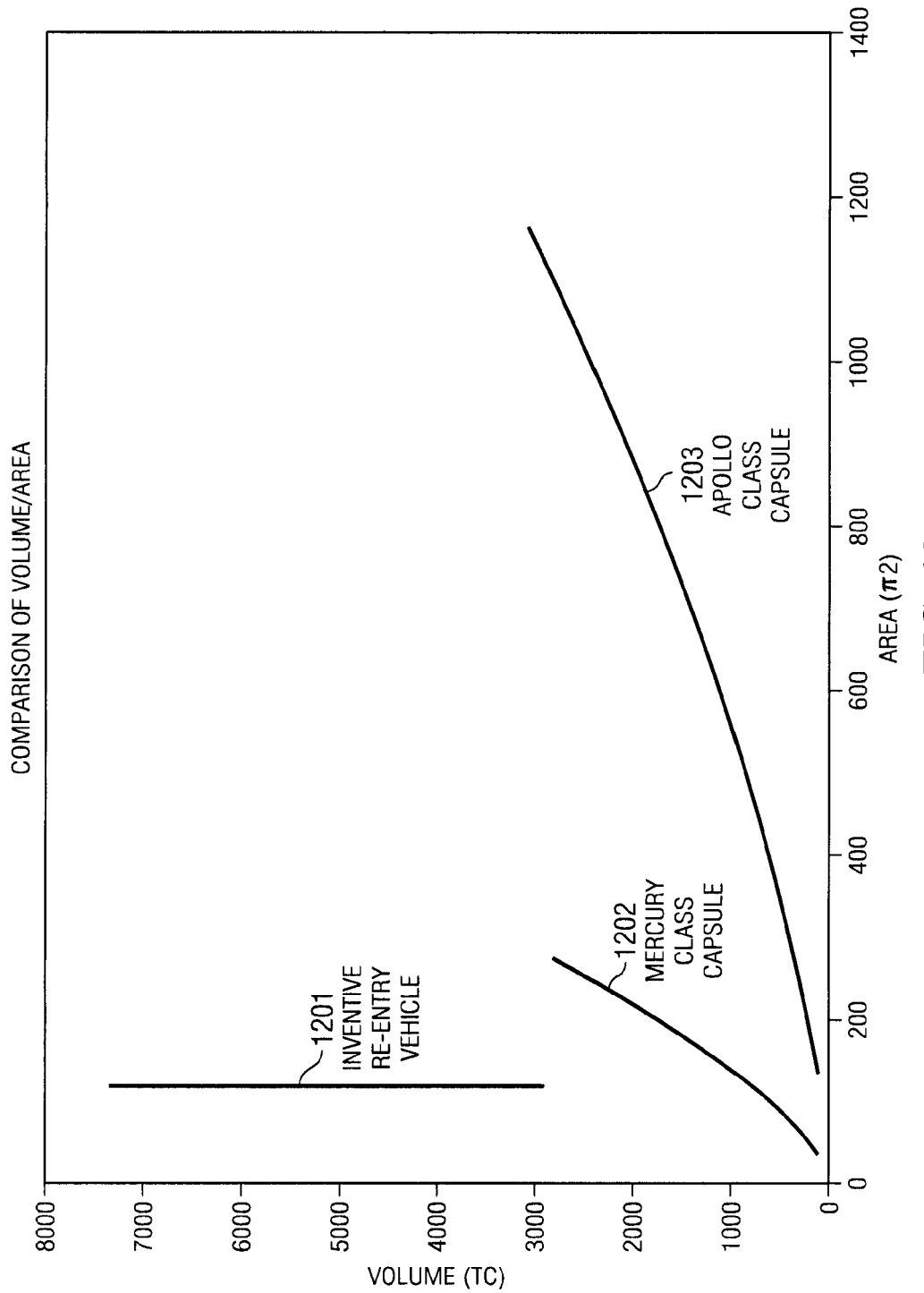
FIG. 12 shows a graph of volume versus area for different reentry vehicles.

FIG. 12 shows a graph of the frontal area of a reentry vehicle versus the volume of the reentry vehicle. The chart includes three vehicles, a reentry vehicle in accordance with one or more disclosed embodiments 1201, a Mercury class capsule 1202, and an Apollo class capsule 1203. As shown, the Mercury 1202 and Apollo 1203 class vehicles require significant changes in the frontal area of the vehicle to affect a change in volume. Additionally, the total volume of the Mercury 1202 and Apollo 1203 class capsules is very limited.

In some embodiments, a reentry vehicle may include larger volumes without affecting the frontal area, as shown at 1201. The ballistic coefficient of a reentry vehicle in accordance with one or more disclosed embodiments is largely not affected by the volume of the vehicle. The line 1201 in FIG. 12 representing one or more disclosed embodiments need not stop as shown in FIG. 12. The volume may be increased to any necessary design size.

Figure 13A:
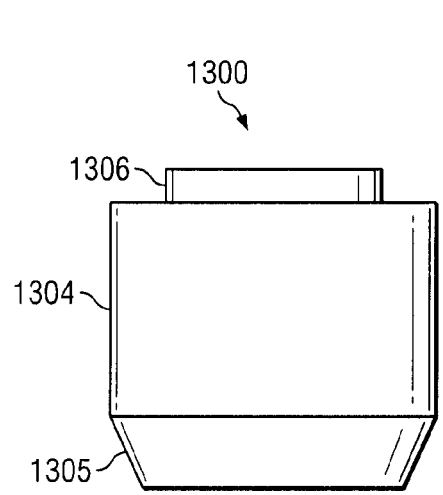
FIG. 13A shows a vehicle constructed using modular components.

FIG. 13A shows a modular vehicle 1300 that may serve as a secondary structure for another reentry vehicle. For example, a particular reentry vehicle may not be well suited for carrying particular types of payloads. Embodiments of a modular vehicle may be constructed that are adapted to fit well into a primary vehicle and to hold the payload. There would not be a need to adapt the existing primary vehicle to carry a specialized payload. For example, a particular payload or even crew members may require constant pressurization during a mission. A modular vehicle 1300 may be used as a secondary structure for a different primary vehicle, where the primary vehicle is not configured for pressurization.

The modular vehicle 1300 in FIG. 13A includes one module 1304 with an adapter 1305 for connecting the modular vehicle to a primary vehicle, not shown. The vehicle 1300 also includes a CBM 1306 that will enable access to the interior of the vehicle 1300. A CBM 1306 used in connection with a modular vehicle 1300 as a secondary structure for a primary vehicle may also enable the primary vehicle to dock with a space station or other structure.

Figure 13B:
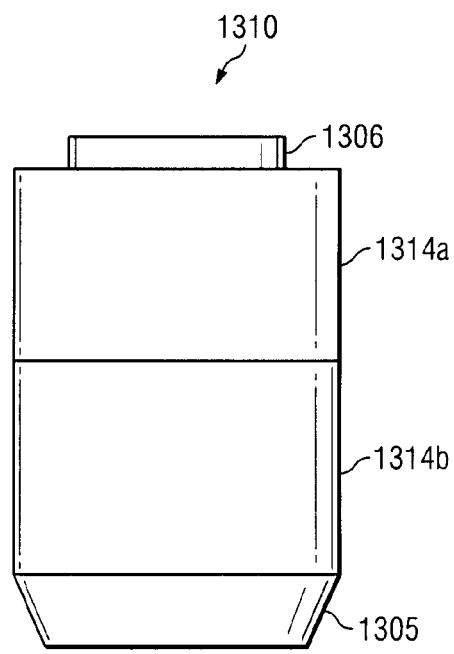
FIG. 13B shows a vehicle constructed using modular components.

FIG. 13B shows a modular vehicle 1310 that includes two modules 1314a, 1314b. As with a reentry vehicle, the length and volume of a modular vehicle 1310 may be selected based on the needs of a particular mission. The vehicle 1310 includes an adapter 1305 and a CBM 1306 as described above.

Figure 13C:
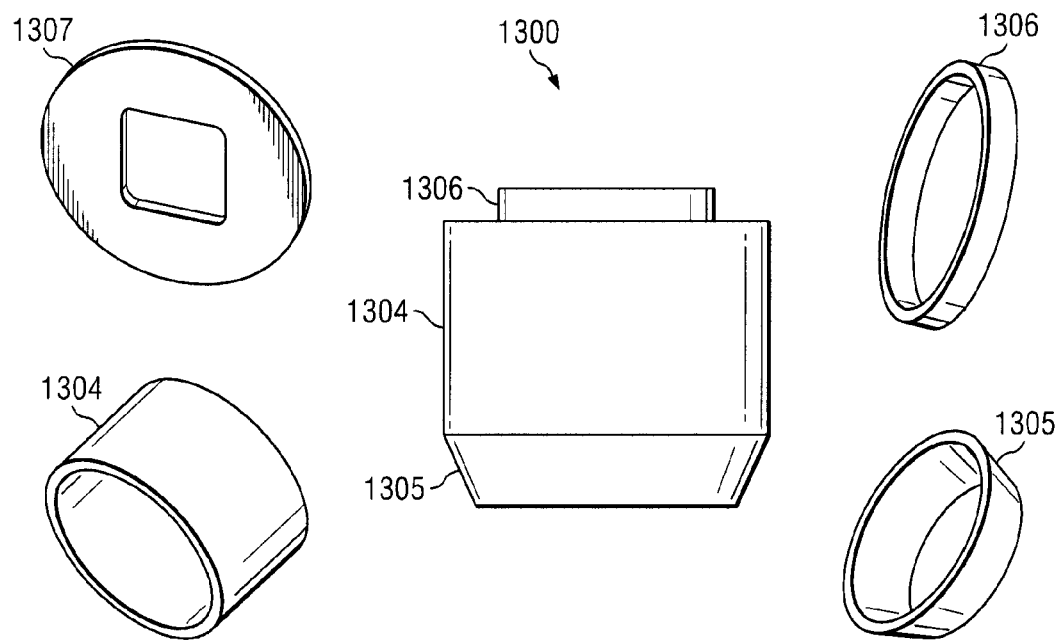
FIG. 13C shows the components of a vehicle constructed using modular components.

FIG. 13C shows the modular vehicle 1300 of FIG. 13A in an expanded form to show how the components may fit together. A CBM 1306 is connected to a module 1304, with a bulk head 1307 in between. At the other end of the module 1304, an adapter 1305 is attached so that the vehicle 1300 may be connected to a primary vehicle.

Figure 14:
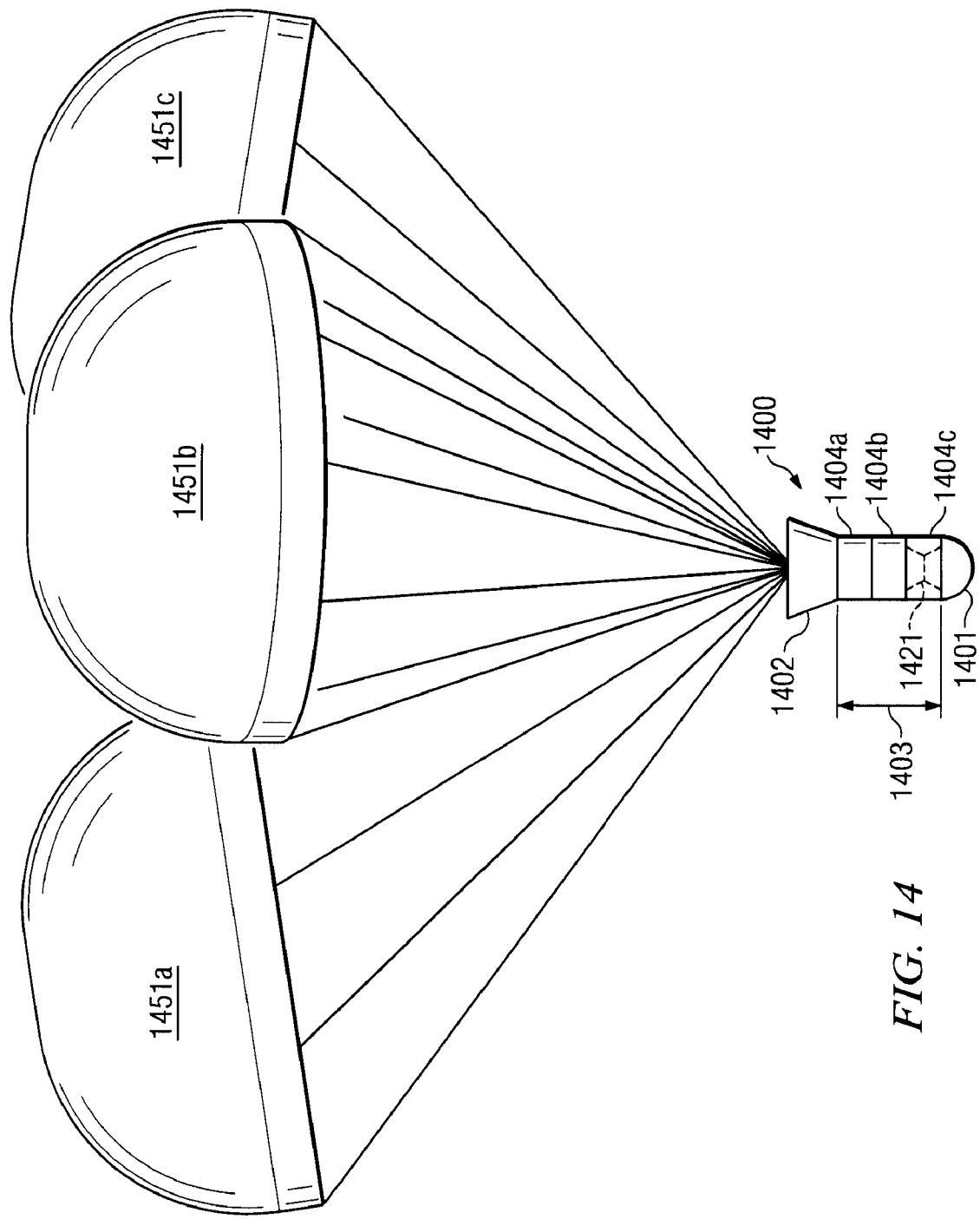
FIG. 14 shows a side view of one embodiment of a reentry vehicle after reentry.

FIG. 14 shows another embodiment of a reentry vehicle 1400 that includes a nose 1401, a modular section 1403, and a flared section 1402. The modular section 1403 in FIG. 14 includes three modules 1404a, 1404b, 1404c that are visible above the flared section 1402. Additional modules and an aft module may be covered by the flared section 1402 so that they are protected during reentry.

FIG. 14 shows the reentry vehicle 1400 after reentry, as the vehicle 1400 is descending toward the landing point. The vehicle 1400 is being lowered to the surface by a set of parachutes 1451a, 1451b, 1451c. A reentry vehicle may include parachutes of different sizes that are designed to be deployed at different times during the reentry. A parafoil may be used in place of a parachute.

The reentry vehicle 1400 may include one or more devices to reduce the impact of landing. For example, the nose 1401 may include an air bag 1421 that may be inflated or deployed just prior to landing to absorb the landing impact of the vehicle 1400. In addition, the nose 1401 itself may be constructed of a crushable material that will absorb the landing impact. A reentry vehicle may use one of these methods or both in conjunction.

Other devices to reduce landing impact include a retro rocket or a parachute retraction device. A retro rocket is a small rocket engine that is fired in the downward direction just prior to landing to reduce the speed at landing. A parachute retraction device pulls on the cables that attach the parachutes, again to reduce the speed of the vehicle at landing.

Other impact absorbing methods may also be used. Further, it is noted that some embodiments of a reentry vehicle may not include any impact absorbing devices. For example, if the reentry vehicle were designed for a water landing, in which case, the reentry vehicle may be fitted with a flotation system.

Typically, a drogue parachute, not shown, is deployed prior to the main parachute, while the vehicle is still traveling at supersonic speeds. In some embodiments, a drogue parachute is used to remove the flared conic section 1402. For example, if the flared conic section 1402 includes an inflatable bladder, the pressure in the bladder may be much less than the ambient pressure at sea level. Typically, a pressure of 2 psia will be sufficient to maintain the shape of the flared section 1402 in space and during reentry. At atmospheric conditions, the flared conic section 1402 may deflate and interfere with suspension lines or recovery operations.

Some embodiments of a reentry vehicle enable the vehicle to land in a vertical direction. Because the vehicle also launches in a vertical direction, the same structure may support the vehicle during launch and landing. A horizontal landing, for example, as with the space shuttle, requires additional structure to withstand the horizontal forces of landing. The mass of the additional structure creates a significant penalty on the payload that may be carried into space. It may be desirable to discard the flared section 1402 just prior to parachute deployment to prevent interference. In addition, the flared section may be removed from the vehicle by a drogue or pilot parachute. The flared section 1402 may also stay on the reentry vehicle 1400. In such a case, a pressurized bladder may be further pressurized to a pressure above atmospheric pressure and then used as a flotation device after landing.

Certain of the disclosed illustrative embodiments may present one or more of the following advantages. For example, one or more disclosed embodiments of a reentry vehicle may include a modular section so that the volume and payload capacity may be varied to suit the particular mission requirements. Advantageously, such a vehicle may be designed to maximize the volume of a launch vehicle fairing. In addition, such a vehicle may be capable of being launched in a variety of launch vehicles with a minimum of reconfiguration.

Advantageously, one or more of the disclosed illustrative embodiments of a reentry vehicle may be suitable for reentry at various velocities, such as a low orbital velocity, a direct lunar return velocity, and a hyperbolic velocity. Advantageously, certain embodiments may enlarge the reentry corridor through the use of a variable geometry or two-stage flared conic section.

Advantageously, a reentry vehicle may be designed such that it's hypersonic stability is relatively insensitive to the position of the center of gravity. The hypersonic stability may be relatively insensitive to the loading of the vehicle.

Advantageously, a reentry vehicle may require a minimum amount of refurbishment before a subsequent launch. In addition, the structural mass of a reentry vehicle may be minimized, while still providing adequate margins of safety.

Advantageously, the modularity of certain embodiments of a reentry vehicle enables the fabrication of a reentry vehicle to be simple and inexpensive. For example, the structure may be fabricated by pre-forming cylindrical panels and milling out an isogrid webbing to provide an integral ribbing, beams, and pressure hull without the need for welding or bonding. The hull may be formed of a honeycomb core bonded to metal sheets or foam core composites. These are possible construction advantages, but a reentry vehicle is not so limited.

Advantageously, certain embodiments of a reentry vehicle enable the capture of a payload into the vehicle, which may then be pressurized. Crew may then operate or provide maintenance to the payload in a pressurized environment that does not require bulky space suits. The number and complexity of tasks that may be performed are substantially increased.

Advantageously, a reentry vehicle may be configured to dock or berth with a variety of other space craft. For example, if a mission includes docking with the International Space Station, the reentry vehicle may include the appropriate docking or berthing means. The modular nature of the reentry vehicle enables it to be reconfigured to dock or berth with a different vehicle on a different mission.

Advantageously, the internal volume of a reentry vehicle may be changed without affecting the stability of the vehicle. In addition, the volume may be changed without affecting the L/D ratio of the vehicle, as well as the ballistic coefficient.

Advantageously, one or more of the illustrative embodiments enable the widening of a reentry corridor. A wide reentry corridor relaxes the requirements for a guidance system on the reentry vehicle.

A reentry vehicle has been described that includes a nose section, a modular section comprised of two or more connected modules, and a flared section. The nose section is connected to a first end of the modular section, and the flared section is positioned proximate a second end of the modular cylindrical section. In an exemplary embodiment, the modular section comprises a cylindrical cross section. In an exemplary embodiment, two or more of the cylindrical modules have substantially the same length and substantially the same diameter.

In an exemplary embodiment, an aft module is configured to form an aft section of the reentry vehicle, and wherein the aft module, the plurality of modules, and the nose are connected to form an air-tight interior. In an exemplary embodiment, the aft module comprises a hatch. In an exemplary embodiment, the aft module comprises a propulsion and guidance system. In an exemplary embodiment, the aft module is hingedly connected to a next cylindrical module and moveable between an open position and a closed position.

In an exemplary embodiment, the reentry vehicle is not air-tight. In an exemplary embodiment, a diameter of the modular section is selected to be less than a minimum inner diameter of one or more launch vehicles.

In an exemplary embodiment, the flared section is moveable between a stowed position and a deployed position. In an exemplary embodiment, the flared section is asymmetrical. In an exemplary embodiment, the flared section comprises an adjustable geometry flared section that may be positioned in a selected configuration. In an exemplary embodiment, the reentry vehicle includes an inflatable bladder disposed under the flared section to selectively control the configuration of the flared section. In an exemplary embodiment, the flared section comprises a first stage flared section having a first diameter and a second stage flared section having a second diameter, and wherein the first diameter is larger than the second diameter.

In an exemplary embodiment, the flared section is constructed of a refractory material having an ablative coating. In an exemplary embodiment, the refractory material is a fabric. In an exemplary embodiment, the reentry vehicle includes an inflatable bladder positioned under the flared conical section. In an exemplary embodiment, the flared section is constructed of a high temperature tolerant material. In an exemplary embodiment, the high temperature tolerant material is a metal. In an exemplary embodiment, the metal is INCONEL.

In an exemplary embodiment, a range for a center of gravity of the reentry vehicle is forward of a center of pressure of the reentry vehicle. In an exemplary embodiment, the range for the center of gravity is separated from a centerline of the reentry vehicle.

In an exemplary embodiment, the nose is hingedly connected to a first module and moveable between an open position and a closed position. In an exemplary embodiment, one or more of the modules includes a hinged section that forms at least one bay door. In an exemplary embodiment, the nose is connected to the modular section by one or more rails, and wherein the nose is moveable on the rails between an open position and a closed position. In an exemplary embodiment, the rails comprise powered rails. In an exemplary embodiment, the nose and one or more modules are connected to an aft section of the reentry vehicle by one or more rails, and wherein the nose and one or more modules are moveable on the rails between an open position and a closed position.

In an exemplary embodiment, the reentry vehicle includes a perforated structure positioned inside the modular section when the nose and one or more modules are in the closed position. In an exemplary embodiment, perforations in the perforated structure are sized to be larger than a payload. In an exemplary embodiment, the reentry vehicle is configured to transport a crew. In an exemplary embodiment, at least one of the modules includes an access port. In an exemplary embodiment, the access port is configured to mate with a second access port in a launch vehicle fairing. In an exemplary embodiment, the nose is a blunt nose. In an exemplary embodiment, the nose is a hemispherical nose.

In an exemplary embodiment, the nose is constructed of a crushable material. In an exemplary embodiment, the reentry vehicle includes a deployable air bag disposed in the nose. In an exemplary embodiment, the reentry vehicle includes one or more deceleration parachutes. In an exemplary embodiment, the one or more deceleration parachutes comprise at least two deceleration parachutes having different sizes.

A method of transferring a payload in orbit has been described that includes docking a reentry vehicle with an object in orbit, depressurizing the reentry vehicle, opening an access port in the reentry vehicle, transferring the payload, closing the access port, and pressurizing the reentry vehicle. In an exemplary embodiment, the step of transferring the payload comprises capturing the payload. In an exemplary embodiment, the step of transferring the payload comprises deploying the payload. In an exemplary embodiment, the step of opening the access port comprises moving a nose section hinged to a modular section from a closed position to an open position. In an exemplary embodiment, the step of opening the access port comprises moving at least one bay door from a closed position to an open position. In an exemplary embodiment, the step of opening the access port comprises moving an aft section hinged to a modular section from a closed position to an open position.

In an exemplary embodiment, the step of opening the access port comprises moving a nose section connected to a modular section by rails from a closed position to an open position. In an exemplary embodiment, the step of opening the access port comprises moving a nose section and a modular section connected to an aft section by rails from a closed position to an open position.

A method of entering a planetary atmosphere has been described that includes deploying a flared section of a reentry vehicle to a first position, dissipating kinetic energy in a rarefied portion of the atmosphere, and deploying the flared section in a second position. The first position has a larger cross sectional area than the second position, and the reentry vehicle approaches the planetary atmosphere above an overshoot boundary for the vehicle when the flared section is in the second position. In an exemplary embodiment, the first position comprises a first stage flared conical section and the second position comprises a second stage conical section. In an exemplary embodiment, the flared conical section is an adjustable geometry flared conical section moveable between the first position and the second position.

A reentry vehicle has been described that includes a modular section comprised of two or more modules sealingly coupled to each other, a nose section connected to a first of the two or more modules at a first end of the modular cylindrical section, and a flared conical section proximate a second end of the modular cylindrical section and positioned to protect at least one of the one or more cylindrical modules. An aft one of the one or more modules forms an aft cylindrical module and comprises a crew hatch and a propulsion and maneuvering system. In an exemplary embodiment, the nose section is hingedly connected to the first cylindrical module and moveable between an open position and a closed position, and wherein the nose is sealingly coupled to the first cylindrical module when in the closed position.

In an exemplary embodiment, the nose is connected to the first module by one or more powered rails and moveable between an open position and a closed position, and wherein the nose is sealingly coupled to the first module when in the closed position. In an exemplary embodiment, the nose and the modular section are connected to the aft cylindrical module by one or more power rails and moveable between an open position and a closed position, and further comprising a perforated structure connected to the aft cylindrical module so that the perforated structure is disposed within the modular section when the nose and the modular section are in the closed position.

In an exemplary embodiment, the aft cylindrical module is hingedly connected to an adjacent cylindrical module and moveable between an open position and a closed position, and wherein the aft cylindrical module is sealingly coupled to the adjacent cylindrical module when in the closed position. In an exemplary embodiment, one or more of the two or more cylindrical modules each comprise one or more connected hinged sections that form one or more bay doors moveable between an open position and a closed position. In an exemplary embodiment, the reentry vehicle includes crew accommodations in the reentry vehicle.

A reentry vehicle has been described that includes a means for dissipating reentry heat, a means for stabilizing the reentry vehicle during hypersonic flight, and a means for selecting a payload volume of the reentry vehicle. In an exemplary embodiment, the reentry vehicle includes a means for expanding entry parameters. In an exemplary embodiment, the reentry vehicle includes a means for opening the reentry vehicle to capture or deploy a payload. In an exemplary embodiment, the reentry vehicle includes a means for absorbing a landing impact. In an exemplary embodiment, the reentry vehicle includes a means for deploying the means for stabilizing the vehicle.

A modular vehicle has been described that includes at least one module adapted to form a secondary structure for a primary vehicle, and an adapter for connecting the modular vehicle to the primary vehicle. In an exemplary embodiment, the modular vehicle includes a common berthing mechanism. In an exemplary embodiment, the at least one module comprises a plurality of modules. In an exemplary embodiment, the at least one module comprises crew accommodations.

Although this detailed description has shown and described illustrative embodiments of the invention, this description contemplates a wide range of modifications, changes, and substitutions. In some instances, some features of the present invention may be employed without a corresponding use of other features. Accordingly, it is appropriate that readers should construe the appended claims broadly, and in a manner consistent with the scope of the invention.

What is claimed is:

1. A reentry vehicle, comprising:
   a nose section;
   a modular section comprised of two or more connected modules;
   a flared section having an adjustable frusto-conical shape;
   an inflatable bladder disposed under the flared section to selectively control the configuration of the flared section,
   wherein the nose section is connected to a first end of the modular section, and the flared section is positioned proximate a second end of the modular section.

2. The reentry vehicle of claim 1, wherein the modular section comprises a cylindrical cross section.

3. The reentry vehicle of claim 1, wherein two or more of the modules have substantially the same length and substantially the same diameter.

4. The reentry vehicle of claim 3, wherein an aft module is configured to form an aft section of the reentry vehicle, and wherein the aft module, the plurality of modules, and the nose section are connected to form an air-tight interior.

5. The reentry vehicle of claim 4, wherein the aft module comprises a hatch.

6. The reentry vehicle of claim 4, wherein the aft module comprises a propulsion and guidance system.

7. The reentry vehicle of claim 4, wherein the aft module is hingedly connected to a next module and moveable between an open position and a closed position.

8. The reentry vehicle of claim 1, wherein the reentry vehicle is not air-tight.

9. The reentry vehicle of claim 1, wherein the flared section is moveable between a stowed position and a deployed position.

10. The reentry vehicle of claim 1, wherein the flared section is asymmetrical.

11. The reentry vehicle of claim 1, wherein the flared section comprises a first stage flared section having a first diameter and a second stage flared section having a second diameter, and wherein the first diameter is larger than the second diameter.

12. The reentry vehicle of claim 1, wherein the flared section is constructed of a refractory material having an ablative coating.

13. The reentry vehicle of claim 12, wherein the refractory material is a fabric.

14. The reentry vehicle of claim 13, further comprising an inflatable bladder positioned under the flared section.

15. The reentry vehicle of claim 1, wherein the flared section is constructed of a high temperature tolerant material.

16. The reentry vehicle of claim 15, wherein the high temperature tolerant material is a metal.

17. The reentry vehicle of claim 16, wherein the metal is INCONEL.

18. The reentry vehicle of claim 1, wherein a range for a center of gravity of the reentry vehicle is forward of a center of pressure of the reentry vehicle.

19. The reentry vehicle of claim 18, wherein the range for the center of gravity is separated from a centerline of the reentry vehicle.

20. The reentry vehicle of claim 1, wherein the nose section is hingedly connected to a first module and moveable between an open position and a closed position.

21. The reentry vehicle of claim 1, wherein one or more of the modules includes a hinged section that forms at least one bay door.

22. The reentry vehicle of claim 1, wherein the nose section is connected to the modular section by one or more rails, and wherein the nose section is moveable on the rails between an open position and a closed position.

23. The reentry vehicle of claim 22, wherein the rails comprise powered rails.

24. The reentry vehicle of claim 1, wherein the nose section and one or more modules are connected to an aft of the reentry vehicle by one or more rails, and wherein the nose section and one or more modules are moveable on the rails between an open position and a closed position.

25. The reentry vehicle of claim 24, further comprising a perforated structure positioned inside the modular section when the nose section and one or more modules are in the closed position.

26. The reentry vehicle of claim 1, wherein the reentry vehicle is configured to transport a crew.

27. The reentry vehicle of claim 1, wherein at least one of the modules includes an access port.

28. The reentry vehicle of claim 27, wherein the access port is configured to mate with a second access port in a launch vehicle fairing.

29. The reentry vehicle of claim 1, wherein the nose section is a blunt nose section.

30. The reentry vehicle of claim 1, wherein the nose section is a hemispherical nose section.

31. The reentry vehicle of claim 1, wherein the nose section is constructed of a crushable material.

32. The reentry vehicle of claim 1, further comprising a deployable air bag disposed in the nose section.

33. The reentry vehicle of claim 1, further comprising one or more deceleration parachutes.

34. The reentry vehicle of claim 33, wherein the one or more deceleration parachutes comprise at least two deceleration parachutes having different sizes.

35. A reentry vehicle, comprising:
   a modular section comprised of two or more modules sealingly coupled to each other;
   a nose section connected to a first of the two or more modules at a first end of the modular section;
   a flared section having an adjustable frusto-conical shape coupled to the modular section proximate a second end of the modular section and positioned to protect at least one of the two or more modules; and
   an inflatable bladder disposed under the flared section to selectively control the configuration of the flared section,
   wherein an aft one of the two or more modules forms an aft module and comprises a crew hatch and a propulsion and maneuvering system.

36. The reentry vehicle of claim 35, wherein the nose section is hingedly connected to the first module and moveable between an open position and a closed position, and wherein the nose section is sealingly coupled to the first module when in the closed position.

37. The reentry vehicle of claim 35, wherein the nose section is connected to the first module by one or more powered rails and moveable between an open position and a closed position, and wherein the nose section is sealingly coupled to the first module when in the closed position.

38. The reentry vehicle of claim 35, wherein the nose section and the modular section are connected to the aft module by one or more power rails and moveable between an open position and a closed position, and further comprising a perforated structure connected to the aft module so that the perforated structure is disposed within the modular section when the nose section and the modular section are in the closed position.

39. The reentry vehicle of claim 35, wherein the aft module is hingedly connected to an adjacent module and moveable between an open position and a closed position, and wherein the aft module is sealingly coupled to the adjacent module when in the closed position.

40. The reentry vehicle of claim 35, wherein one or more of the two or more modules each comprise one or more connected hinged sections that form one or more bay doors moveable between an open position and a closed position.

41. The reentry vehicle of claim 35, further comprising crew accommodations in the reentry vehicle.

42. A reentry vehicle, comprising:
a modular section comprising a plurality of modules;
a flared section proximate a first end of the modular section;
an inflatable bladder disposed under the flared section to selectively control the configuration of the flared section;
a nose coupled to a second end of the modular section; and
a deployable air bag disposed at least partially within the nose.

43. The reentry vehicle of claim 42 wherein the modular section has a substantially cylindrical cross section.

44. The reentry vehicle of claim 42 wherein the plurality of modules are configured to collectively form an air-tight interior.

45. The reentry vehicle of claim 42 wherein an end one of the plurality of modules is hingedly connected to a neighboring one of the plurality of modules and moveable between an open position and a closed position.

46. The reentry vehicle of claim 42 wherein the flared section is moveable between a stowed position and a deployed position.

47. The reentry vehicle of claim 42 wherein at least one of the plurality of modules comprises a hinged section that forms at least one bay door.

48. The reentry vehicle of claim 42 wherein an end one of the plurality of modules is movable between an open position and a closed position on at least one rail connecting the end one of the plurality of modules to a neighboring one of the plurality of modules.

49. A reentry vehicle, comprising:
a modular section comprising a plurality of modules;
a nose section coupled to a first end of the modular section;
a flared section proximate a second end of the modular section; and
an inflatable bladder located between the flared section and the modular section and configured to selectively orient the flared section relative to the flared section.

50. The reentry vehicle of claim 49 wherein the plurality of modules are configured to collectively form an air-tight interior.

51. The reentry vehicle of claim 49 wherein an end one of the plurality of modules is hingedly connected to a neighboring one of the plurality of modules and moveable between an open position and a closed position.

52. The reentry vehicle of claim 49 wherein the flared section is moveable between a stowed position and a deployed position.

53. The reentry vehicle of claim 49 wherein at least one of the plurality of modules comprises a hinged section that forms at least one bay door.

54. A reentry vehicle, comprising:
a modular section comprising a plurality of modules;
a nose coupled to a first end of the modular section;
a flared section proximate a second end of the modular section; and
an inflatable bladder disposed under the flared section to selectively control the configuration of the flared section;
wherein the modular section comprises an access port configured to mate with a launch vehicle fairing access port.

55. The reentry vehicle of claim 54 wherein the plurality of modules are configured to collectively form an air-tight interior.

56. The reentry vehicle of claim 54 wherein an end one of the plurality of modules is hingedly connected to a neighboring one of the plurality of modules and moveable between an open position and a closed position.

57. The reentry vehicle of claim 54 wherein the flared section is moveable between a stowed position and a deployed position.

58. The reentry vehicle of claim 54 wherein at least one of the plurality of modules comprises a hinged section that forms at least one bay door.

59. A reentry vehicle, comprising:
a modular section comprising a plurality of modules, including an aft module proximate an aft end of the modular section, a front module proximate a forward end of the modular section, and at least one additional module interposing the aft and front modules;
a nose coupled to the front module; and
a flared section proximate the aft end of the modular section;
wherein one of the aft module and the front module is connected to the modular section by at least one rail and is movable on the at least one rail between an open position and a closed position.

60. The reentry vehicle of claim 59 wherein the plurality of modules are configured to collectively form an air-tight interior.

61. The reentry vehicle of claim 59 wherein an end one of the plurality of modules is hingedly connected to a neighboring one of the plurality of modules and moveable between an open position and a closed position.

62. The reentry vehicle of claim 59 wherein the flared section is moveable between a stowed position and a deployed position.

63. The reentry vehicle of claim 59 wherein at least one of the plurality of modules comprises a hinged section that forms at least one bay door.

64. The reentry vehicle of claim 59 wherein the modular section has a substantially cylindrical cross section.

* * * * *